United States Patent [19]
Mukai et al.

[11] Patent Number: 6,011,648
[45] Date of Patent: Jan. 4, 2000

[54] OPTICAL SYSTEM HAVING AN OPTICAL ELEMENT MADE OF RESIN

[75] Inventors: Hiromu Mukai, Kawachinagano; Tetsuo Kohno, Toyonaka; Yasushi Yamamoto, Kishiwada; Yutaka Inoue, Osaka; Kyoko Yamaguchi, Sakai, all of Japan

[73] Assignee: Minolta Co., Ltd., Osaka, Japan

[21] Appl. No.: 09/079,204

[22] Filed: May 15, 1998

[30] Foreign Application Priority Data

| May 15, 1997 | [JP] | Japan | 9-125179 |
| May 15, 1997 | [JP] | Japan | 9-125180 |
| May 15, 1997 | [JP] | Japan | 9-125181 |
| Oct. 30, 1997 | [JP] | Japan | 9-298391 |
| Oct. 30, 1997 | [JP] | Japan | 9-298392 |
| Oct. 30, 1997 | [JP] | Japan | 9-298393 |

[51] Int. Cl.[7] .......................... G02B 23/00; G02B 15/14
[52] U.S. Cl. ..................... 359/431; 359/362; 359/642; 359/686
[58] Field of Search .................... 359/362, 399, 359/355–357, 404, 407, 421–422, 431–432, 614–615, 642, 601, 686, 820; 525/438–444, 506, 533, 538; 528/88, 99, 171–194, 275–295; 524/537, 588, 604, 611; 396/373–386

[56] References Cited

U.S. PATENT DOCUMENTS

| 5,442,481 | 8/1995 | Hasushita | 359/601 |
| 5,581,400 | 12/1996 | Takase et al. | 359/362 |
| 5,675,440 | 10/1997 | Kanamori | 359/686 |

FOREIGN PATENT DOCUMENTS

| 6-49186 | 2/1994 | Japan . |
| 8-109249 | 4/1996 | Japan . |

*Primary Examiner*—Thong Nguyen
*Attorney, Agent, or Firm*—Burns, Doane, Swecker & Mathis, LLP

[57] ABSTRACT

An optical system includes a first optical element formed of a noncrystalline polyester resin having a copolymer ratio of 9,9-bis [4(2-hydroxyethoxy) phenyl]fluorene in a range of 35 molar percent to 45 molar percent when the dicarboxylic acid component is 100 molar percent, and a second optical element formed of material incorporating an ultraviolet light absorption agent and disposed at least either anteriorly or posteriorly to the first optical element.

30 Claims, 15 Drawing Sheets

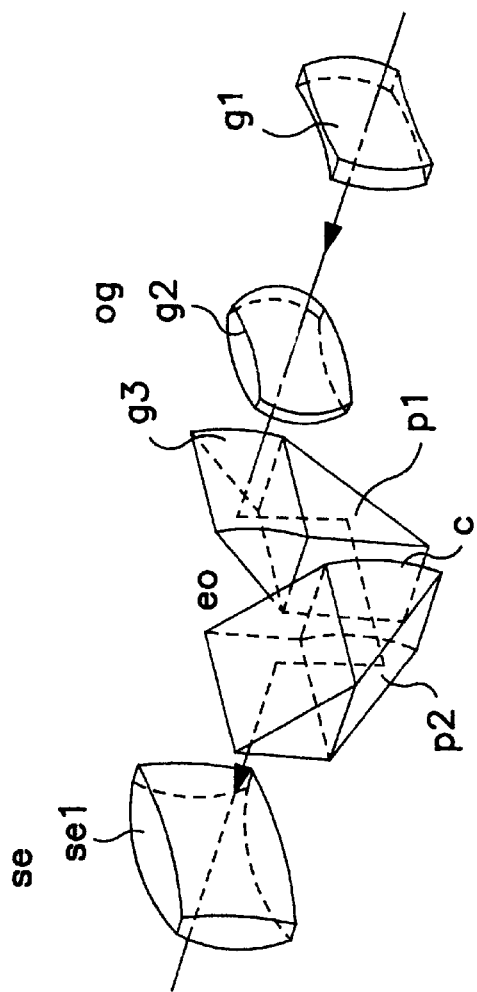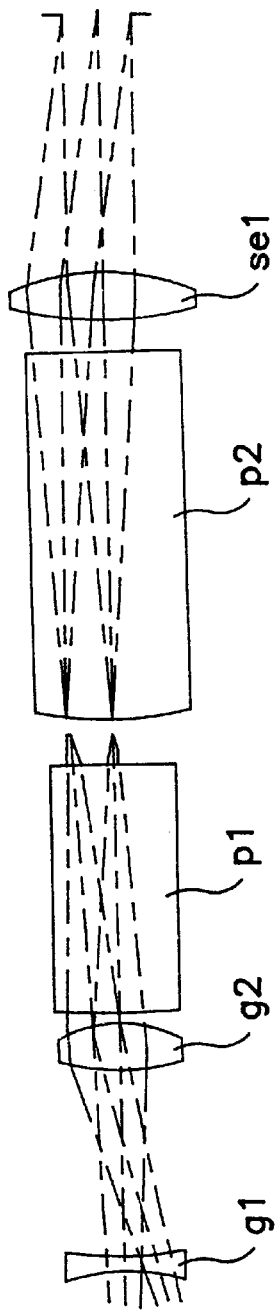

tangential for e-line
sagital for e-line
tangential for c-line
sagital for c-line
tangential for g-line
sagital for g-line

OPTICAL SYSTEM HAVING AN OPTICAL ELEMENT MADE OF RESIN

This application is based on Application Nos. 9-298391, 9-298392, 9-298393, 9-125179, 9-12180 and 9-12181 filed in Japan, the contents of which are hereby incorporated by reference.

BACKGROUND OF THE INVENTION

1. Field of the Invention

The present invention relates to an optical system suitable for binoculars, and optical devices such as digital cameras, instant cameras and the like.

2. Description of the Related Art

Conventionally, optical glass or optical resin has been used as material for forming the optical elements used in the optical systems of various optical devices. Although optical glass utilizes many materials to combine refractive index and dispersion, the cost of these materials is disadvantageously high and they are not easily molded to shape. In recent years, optical elements in optical systems often have come to be designed with aspherical surfaces to achieve aberration correction and the like. The additional process of forming optical elements with aspherical surfaces when optical glass is used is difficult and expensive.

Optical resin, on the other hand, has the advantages of being suitable for mass production, having a light weight, and being readily formed into elements having aspherical surfaces. Conventional examples of optical resins include polycarbonate (PC), polymethylmethacrylate (PMMA) and the like.

Improvement of optical characteristics and compactness of optical system is limited by the use of conventional optical resins. Particularly when attempting to reduce color aberration in an optical system, optical elements (such as negative optical power lens elements having typically small Abbe number and positive optical power lens element typically having large Abbe numbers must be used), polycarbonate (PC) is used as the material for negative lens elements, and polymethylmethacrylate (PMMA) is used as material for positive lens elements. The combination of these materials, however, is inadequate to reduce the number of lens elements in making the optical system more compact, such that several optical resin lens elements having a high or low Abbe number are necessary.

Optical resins which are usable as materials for optical elements must satisfy conditions in addition to Abbe number, such as high transparency in the visible region, excellent formability, small birefringence, excellent environmental stability and the like. Therefore, even though a resin has excellent optical characteristics such as refractive index and Abbe number, it cannot be used as an optical resin unless said resin satisfies these other required characteristics.

SUMMARY OF THE INVENTION

An object of the present invention is to provide an optical system using resin lens elements having excellent optical qualities in the visible region.

A further object of the present invention is to provide an optical system using resin lens elements having characteristics necessary for optical resins and particularly excellent environmental stability.

A still further object of the present invention is to provide an optical system using resin lens elements suitable for mass production.

These objects are attained by providing a first optical system of the present invention, said optical system having a plurality of optical elements, and comprising a first optical element formed of a noncrystalline polyester resin having a copolymer ratio of 9,9-bis {4-(2-hydroxyethoxy) phenyl}fluorene in a range of 35 molar percent to 45 molar percent when the dicarboxylic acid component is 100 molar percent, and a second optical element formed of material incorporating an ultraviolet light absorption agent and disposed at least anteriorly or posteriorly to said first optical element.

The first optical system of the present invention having the aforesaid construction reduces loss of transmittance on the short wavelength side caused by the affects of ultraviolet ray absorption by the noncrystalline polyester resin due to the excellent ultraviolet ray absorption of the optical element incorporating an ultraviolet light absorption agent and disposed at least either anteriorly or posteriorly to said first optical element.

The aforesaid objects are further attained by providing a second optical system of the present invention, said optical system having a plurality of optical elements, and comprising a first optical element formed of a noncrystalline polyester resin having a copolymer ratio of 9,9-bis {4-(2-hydroxyethoxy) phenyl}fluorene in a range of 35 molar percent to 45 molar percent when the dicarboxylic acid component is 100 molar percent, and a second optical element used for transmittancy correction.

The second optical system of the present invention having the aforesaid construction allows adjustment of the spectral transmittance balance originating in the transmittance characteristics of the noncrystalline polyester resin due to the positioning of the second optical element used for transmittancy correction.

These objects are further attained by providing a third optical system of the present invention, said optical system incorporating a lens element having positive optical power, and at least a single lens element having negative optical power included in said lens element being formed of a noncrystalline polyester resin having a copolymer ratio of 9,9-bis {4-(2-hydroxyethoxy) phenyl}fluorene in a range of 35 molar percent to 45 molar percent when the dicarboxylic acid component is 100 molar percent.

These objects are further attained by providing a fourth optical system of the present invention, said optical system incorporating a lens element having negative optical power, and at least a single lens element having positive optical power included in said lens element being formed of a noncrystalline polyester resin having a copolymer ratio of 9,9-bis {4-(2-hydroxyethoxy) phenyl}fluorene in a range of 35 molar percent to 45 molar percent when the dicarboxylic acid component is 100 molar percent.

These and other objects, advantages and features of the present invention will become apparent from the following description thereof taken in conjunction with the accompanying drawings which illustrate specific embodiments of the invention The invention itself, together with further objects and attendant advantages, will be understood by reference to the following detailed description taken in conjunction with the accompanies drawings.

BRIEF DESCRIPTION OF THE DRAWINGS

FIG. 1 is a perspective view showing the construction of a real image finder optical system of the Kepler type of first and second embodiments;

FIG. 2 shows the lens element construction of the finder optical system of the first embodiment;

In the following description, like parts are designated by like reference numbers throughout the several drawings.

DETAILED DESCRIPTION OF THE PREFERRED EMBODIMENTS

Figure 3A:
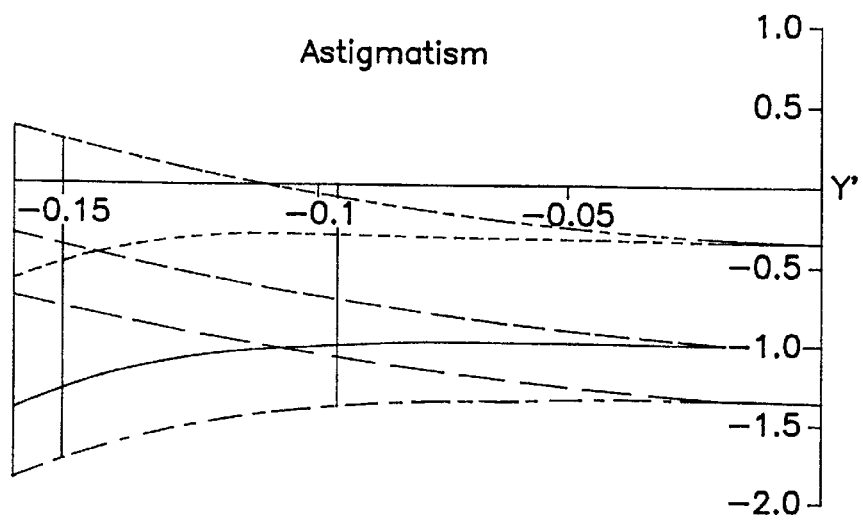
FIGS. 3a–3f are aberration diagrams of the finder optical system of the first embodiment.
Figure 3B:
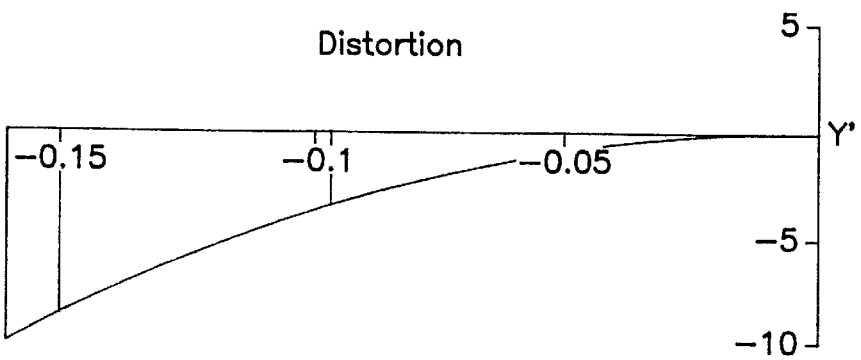
Figure 3C:
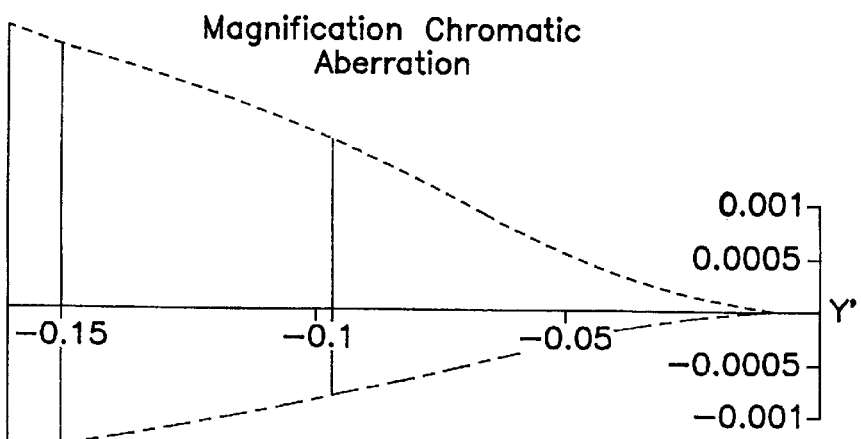
Figure 3D:
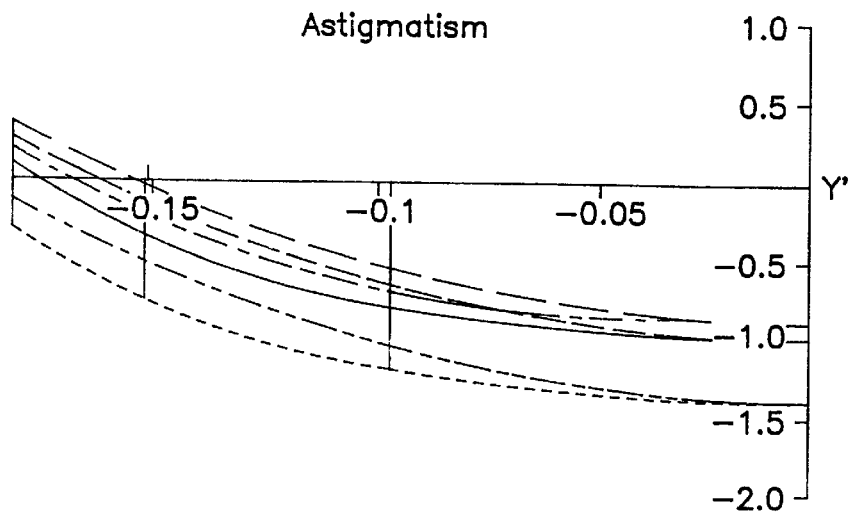
Figure 3E:
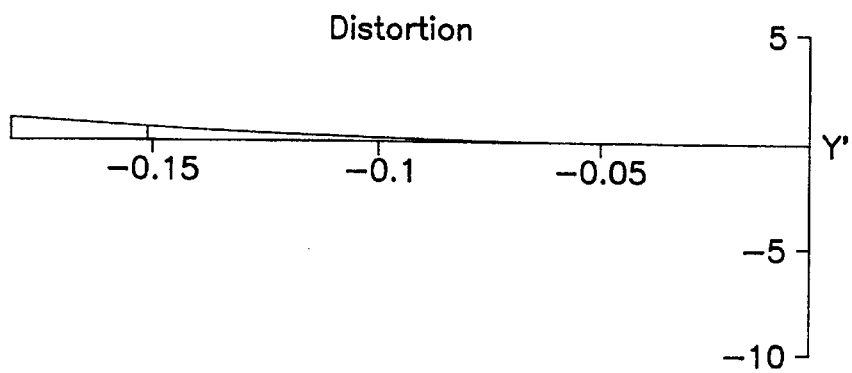
Figure 3F:
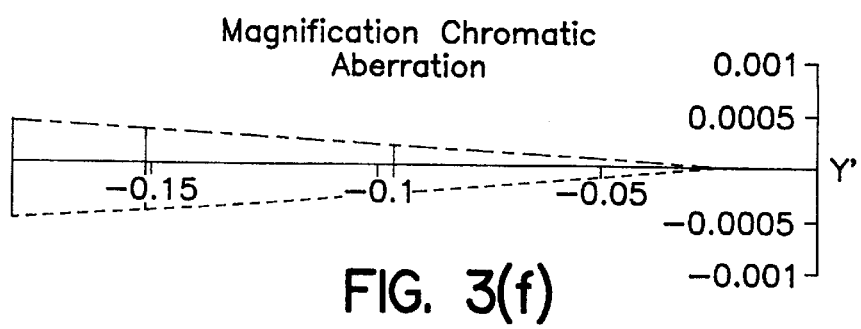

The preferred embodiments of the present invention are described hereinafter.

The noncrystalline polyester resin of the present invention is a copolymer comprising one part ethylene glycol as a diol component of polyester terephthalate substituted in BHEPF (9,9-bis {4-(2-hydroxyethoxy) phenyl}fluorene) having a side chain of fluorene. BHEPF can be manufactured inexpensively using as a raw material fluorene which can be readily synthesized from petroleum chemicals or by extraction from coal or oil tar.

The chemical structure of BHEPF is represented by the structural formula below.

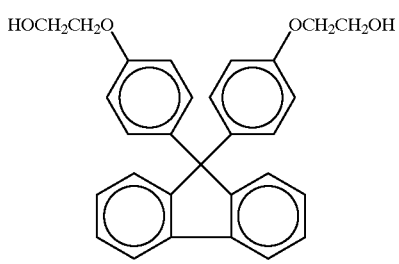

The structure of the repetitive units of the polyester resin having BHEPF is shown below.

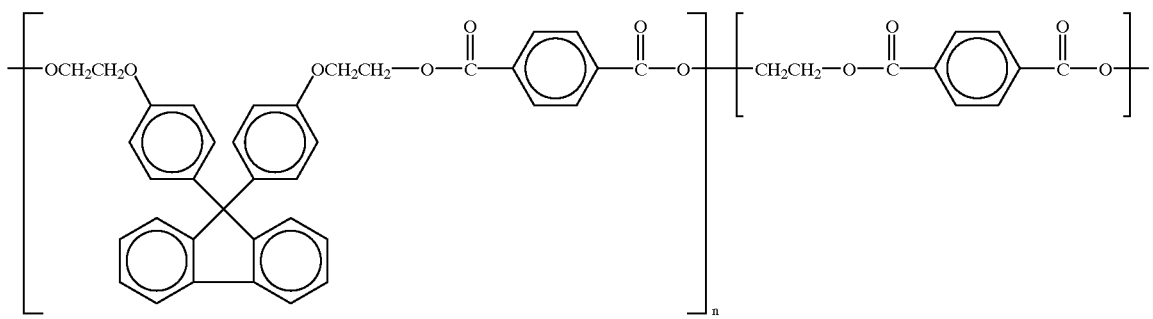

Table 1 shows the characteristics of the polycarbonate (PC), polymethylmethacrylate (PMMA), and noncrystalline polyester resin (OP) used as conventional optical resin.

TABLE 1

|  | NON-CRYSTALLINE POLYESTER | PMMA | PC |
|---|---|---|---|
| Refractive index | 1.62 | 1.49 | 1.58 |
| Abbe No. | 24 | 58 | 31 |
| Birefringence | 20 nm | 20 nm | 50 |
| Light ray transmittance | 90% | 93% | 91% |

The noncrystalline polyester resin used as a conventional optical resin has a relatively high refractive index and low Abbe number. The refractive index, which is particularly problematic in optical resins, has excellent optical isotropy as it becomes extremely small. The low birefringence quality and high refractive index of the noncrystalline polyester resin arises from the aforesaid specific side chain fluorene.

Noncrystalline polyester resin has a small birefringence and small Abbe number and high refractive index, particularly when compared to polycarbonate (PC). Therefore, when applied to an optical system, conventional optical elements must use polycarbonate (PC) which is particularly effective in improving the optical characteristics of the optical system.

The noncrystalline polyester resin of the present embodiment has a BHEPF copolymer ratio in the range of 35 molar percent to 45 molar percent when the dicarboxylic acid component is 100 molar percent, so as to characteristically provide easy formability and excellent color of the resin-formed element. When the BHEPF copolymer ratio is within the aforesaid range, the glass transition temperature of the polyester resin is about 115–125° C. so as to avoid discoloration during molding, and provide a molded member having excellent surface precision. When the BHEPF ratio exceeds 45 molar percent, the glass transition temperature is elevated to over 125° C., and the resin melt temperature is also elevated; discoloration readily occurs due to the higher than necessary temperature the resin attains during molding to maintain accurate surface precision. That is, it is difficult to obtain a colorless molded member which is usable as an optical element when the BHEPF ratio exceeds 45 molar percent. When the copolymer ratio is less than 35 molar percent, on the other hand, the glass transition temperature is less than 110° C., such that deformation may occur when, for example, the element is kept in a car parked in the sun on a summer day, thereby losing the original surface precision, and making it impossible to assure long-term reliability.

Figure 9:
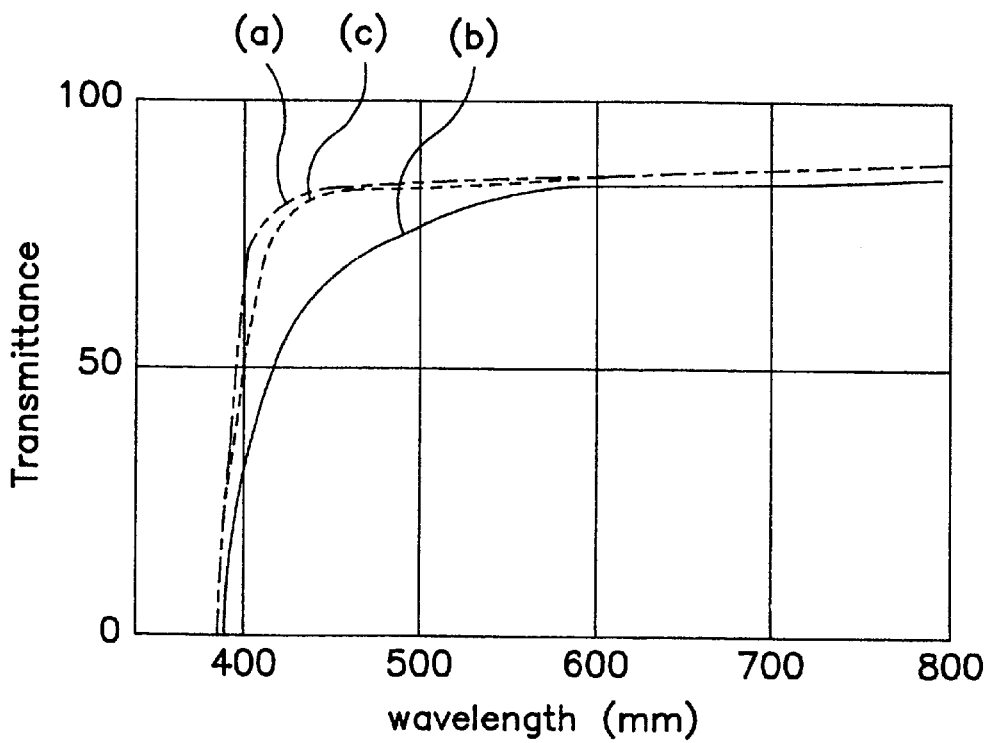
FIG. 9 is a graph illustrating the spectral transmittance characteristics of the noncrystalline polyester resin.

FIG. 9 is a graph showing the spectral transmittance characteristics of the noncrystalline polyester resin. In FIG. 9, curve (a) refers to the spectral transmittance of a sample having an ultraviolet light absorption agent added to the noncrystalline polyester resin, curve (b) refers to the spectral transmittance of the sample of curve (a) irradiated by ultraviolet rays for 200 hr, and curve (c) refers to the spectral transmittance of the sample of curve (a) irradiated by ultraviolet rays for 200 hr while interposed between polymethylmethacrylate (PMMA) having ultraviolet light absorption agent added.

As can be understood from a comparison of curves (a) and (b) of FIG. 9, when subjected to long-term exposure to ultraviolet light, the noncrystalline polyester resin has qualities which produce discoloration and reduced transmittance in the short wavelength range due to the action of ultraviolet light. Even the addition of ultraviolet light absorption agent to the noncrystalline polyester resin itself is inadequately effective against the ultraviolet rays as in the sample of curve (a). Therefore, when and optical element formed of noncrystalline polyester resin is used in an optical system which may be subjected to long-term exposure to ultraviolet rays, it is desirable that an optical element incorporating an ultraviolet light absorption agent is disposed at least either anteriorly or posteriorly to said noncrystalline polyester resin as in curve (c). The provision of an optical element incorporating ultraviolet light absorption agent is more effective at reducing the effects of ultraviolet light absorption by the noncrystalline polyester resin than is adding an ultraviolet light absorption agent to the noncrystalline polyester resin itself.

As can be clearly understood from curve (a) of FIG. 9, the spectral transmittance characteristics of noncrystalline polyester resin tends to be lower on the short wavelength side than on the long wavelength side, and this material is susceptible to discoloration. Accordingly, transmittance correction is desirable when using an noncrystalline polyester resin in an optical system, and transmittance correction is particularly desirable when using a noncrystalline polyester resin as the material to form a thick lens element of prism element due to the marked reduction in transmittance on the short wavelength side.

The simplest transmittance correction method is to add a thin film to the optical element to adjust the transmittance. The balance of transmitted light on the long wavelength side and the short wavelength side may be adjusted by adding a thin antireflection film to the optical element normally comprising the optical system to prevent so-called ghosts with the light reflected by said antireflection layer being amber color. Such a coating can be realized by a thin film having an optical thickness $nd=\lambda/4$ relative to the short wavelength side (500 to 400 nm) (where d represents the film thickness, $\lambda$ represents the design wavelength, and n represents the refractive index relative to the design wavelength of the coating material). Such a coating may be provided on the optical element itself as a material of the noncrystalline polyester resin, or may be provided on another optically functioning surface of the optical system.

Figures 10, 11:
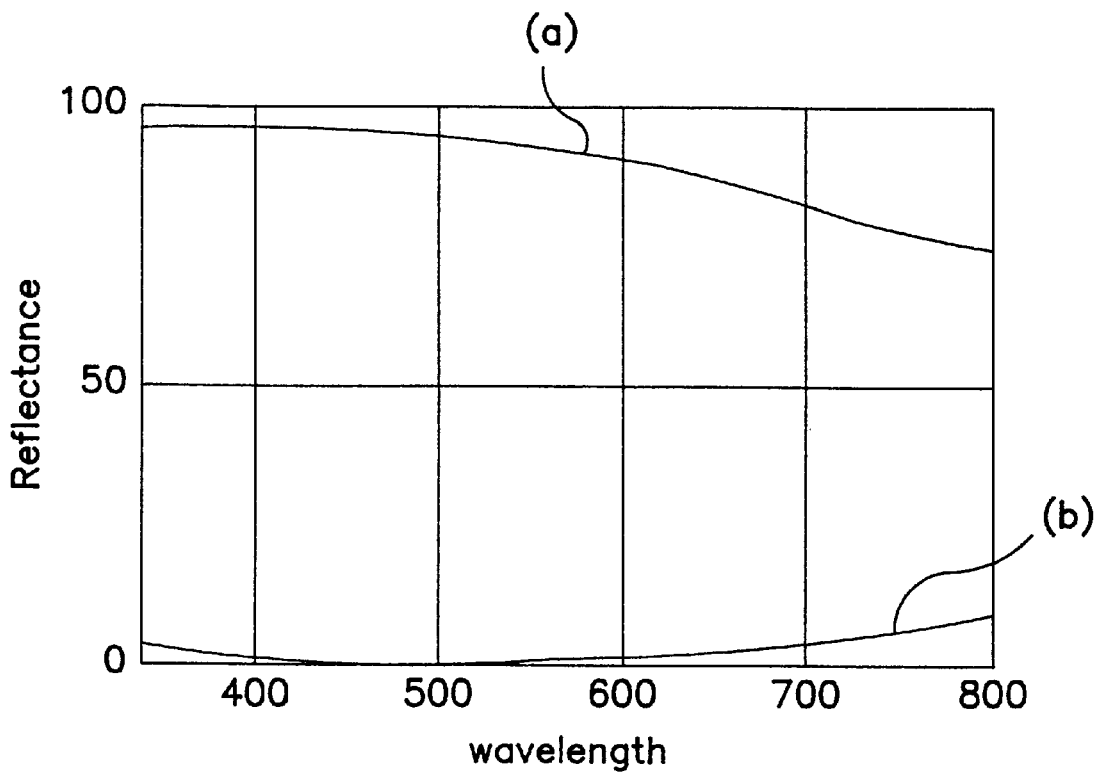
FIG. 10 is a graph representing the construction of the antireflection layer used for transmittance correction.
FIG. 11 is a graph showing the spectral transmittance characteristics of the thin layer used for transmittance correction.

When a reflective mirror surface is used in the construction of the optical system, however, it is possible to correct the transmittance of the optical system by adjusting the spectral transmittance characteristics of the light reflected by said reflecting mirror surface. In this instance, the reflectivity on the short wavelength side may be set higher than on the long wavelength side. The antireflection layer may be achieved by alternate vacuum deposition on the reflection side of a dielectric layer having a low refractive index and optical thickness of $n_1d=\lambda/4$, and a dielectric layer having a high refractive index and optical thickness of $n_2d=\lambda/4$. FIG. 10 shows an example of an aluminum vacuum deposition layer provided on the reflection surface, wherein $MgF_2$ is vacuum deposited on the aluminum deposition layer as a low refractive index material, and $ZnO_2$ is deposited thereon as a high refractive index material, the respective optical thickness of said layers being $nd=\lambda/4$. Alternatively, $SiO_2$ may be used a low refractive index material, and $TiO_2$ or the like may be used as a high refractive index material. Of course, to be effective over a wide wavelength range, the construction of the antireflection layer may be a multilayer construction, or, considering bonding with the reflection surface, an optical construction using materials having excellent bonding characteristics with the side nearest the reflection side.

FIG. 11 shows the spectral reflectivity characteristics of the thin layer used for transmittance correction. In FIG. 11, curve (a) represents the spectral reflectivity characteristics relative to 45° entrance on the antireflection layer of FIG. 10 added to the aforesaid reflection surface. Curve (a) shows more reflection on the short wavelength side than on the long wavelength side, and it can be understood that there is excellent correction of transmittance in the optical system. Curve (b) represents the spectral reflectivity characteristics when an amber coating is provided on the optical element. In this instance, there is more reflection on the long wavelength side than on the short wavelength side, thereby providing excellent correction of transmittance of the optical system when the entire optical system is considered.

APPLICATION TO A FINDER OPTICAL SYSTEM

The optical system of the present embodiment of the invention is described hereinafter in terms of an example application in a finder optical system of a camera or the like with reference to the accompanying drawings.

FIG. 1 is a perspective view briefly showing the construction of a real image finder optical system of the Kepler type of a first embodiment of the present invention, and FIG. 2 shows the optical path of the first embodiment. In FIGS. 1 and 2, the finder optical system of the first embodiment comprises a biconcave first objective lens element g1 having negative optical power and a biconvex second objective lens element g2 having positive optical power, and an erect optical system eo in the form of a Porro prism incorporating a first prism p1 and second prism p2 each respectively having a convex surface g3, c as the entrance surface, and an eyepiece lens system se incorporating an eyepiece lens element se1. An objective lens system og comprises the first objective lens element g1, the second objective lens element g2, and the convex surface g3 formed on the entrance side of the first prism; the first lens element is moved to the pupil side to accomplish variable magnification from the minimum focal length state to the maximum focal length state.

In this construction, the object light entering the objective lens system forms an intermediate image near the entrance surface of the second prism, and after directional correction by the convex condenser surface c provided on the entrance surface of second prism p2, the image is enlarged by eyepiece lens element se1 and reaches the pupil. At this time, the image is inverted left-to-right and top-to-bottom by reflection via the Porro prism comprising the first prism p1 and the second prism p2, and reaches the pupil in the same directional orientation as when entering the objective lens system.

In the optical system of the first embodiment, the first objective lens element g1 is formed of noncrystalline polyester resin, and the second objective lens element g2 is formed of polymethylmethacrylate (PMMA), and the first prism p1 and second prism p2 are formed of polycarbonate (PC). By using resin to form all optical elements of the optical system, manufacturing costs are greatly reduced, and the entire system is lighter in weight compared to constructions using optical elements formed of optical glass.

Color aberration, particularly on-axis color aberration and variable magnification color aberration in the maximum focal length state can be excellently corrected by forming the first objective lens element g1 having negative optical power using a noncrystalline polyester resin having a small Abbe number and high refractive index.

Ultraviolet light absorption agent may be added to either the noncrystalline polyester resin used to form the first objective lens element g1 or the polymethylmethacrylate (PMMA) used to form the second objective lens element g2. This construction reduces the influence of ultraviolet light absorption by the noncrystalline polyester resin. Transmittance correction of the first objective lens element can be achieved by providing the aforesaid amber coating to the surface on the object side of the first objective lens element g1. As a result, the finder optical system of the first embodiment realizes an optical system having flat spectral transmittance characteristics throughout the visible range in the entire optical system and which minimizes the influence of ultraviolet light absorption.

A real image finder optical system of the Kepler type of the second embodiment is described hereinafter. The finder optical system of the second embodiment has substantially identical construction as the finder optical system of the first embodiment and, hence, only points of departure in construction are described below.

In the finder optical system of the second embodiment, the exit surface nearest the pupil side of the second prism p2 of the erect optical system is provided with a slightly concave surface, and the surface of the eyepiece lens system se is provided with negative optical power, and the entirety of the second prism p2 is formed of noncrystalline polyester resin.

Excellent correction of on-axis color aberration and variable magnification color aberration can be achieved throughout the entire variable magnification range by dividing the optical power of the eyepiece lens system se between the negative optical power of the pupil side surface of the second prism p2 and the positive optical power of the eyepiece lens element se1. There is particularly excellent color aberration correction performance in the entire eyepiece lens system which produces excellent images without color bleed by constructing the second prism p2 with a surface having negative optical power using noncrystalline polyester resin having a small Abbe number and high refractive index compared to using polycarbonate (PCP).

Although color aberration correction is accomplished by providing a concave surface on the pupil side surface of the second prism p2 in the second embodiment, effective correction can be achieved for color aberration produced by the eyepiece lens system simply by forming the second prism p2 so as to have a flat surface on the pupil side using noncrystalline polyester resin as in the first embodiment due to the low Abbe number of noncrystalline polyester resin.

Since noncrystalline polyester resin has a high refractive index, light is easily and completely reflected by the resin used for internal reflection as in the case of a Porro prism, thereby realizing a bright finder optical system.

Since noncrystalline polyester resin has low birefringence, its use is effective in achieving excellent optical characteristics in a molded exit prism because birefringence generated by internal response is minimized when molding a Porro prism of complex configuration.

Although a Porro prism is used as an erect optical system in the first and second embodiments, it is to be noted that other well known erect optical systems may be used, e.g., penta-roof prism and the like. In this instance, these prisms also may be formed using noncrystalline polyester resin.

Figure 6:
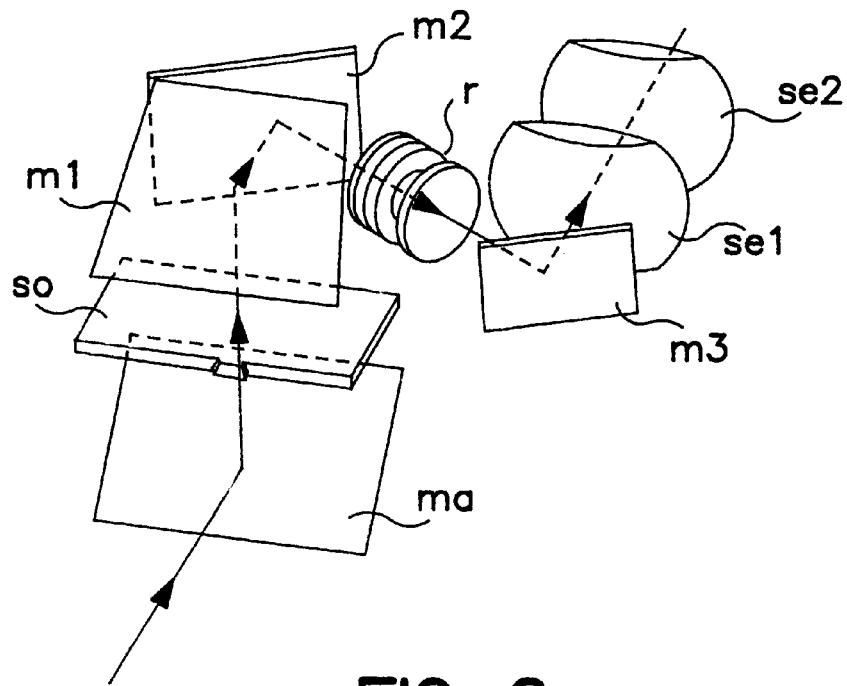
FIG. 6 is a perspective view showing the construction of the real image finder optical system of the Kepler type of a third embodiment.
Figure 5A:
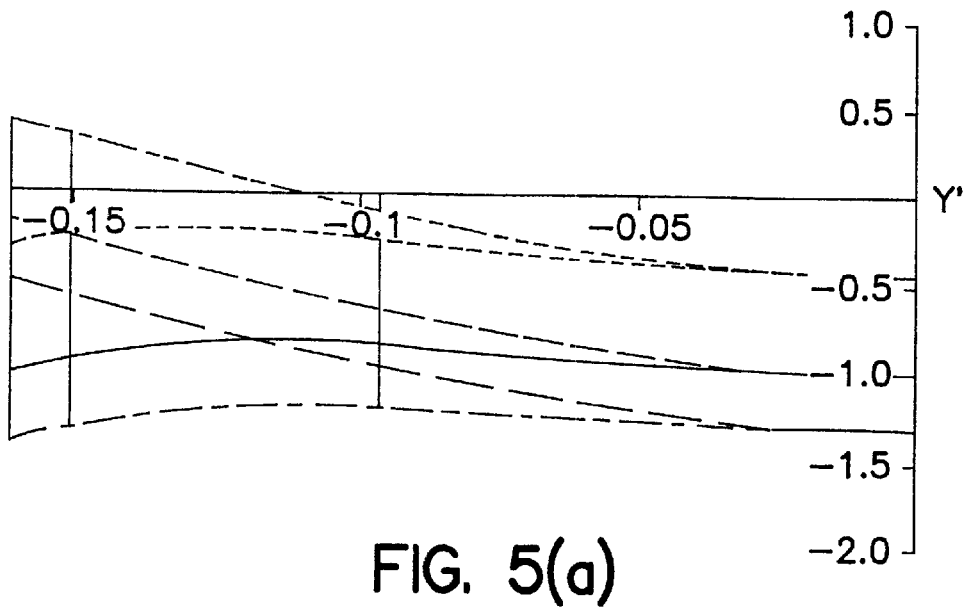
FIGS. 5a–5f are aberration diagrams of the finder optical system of the second embodiment.
Figure 5B:
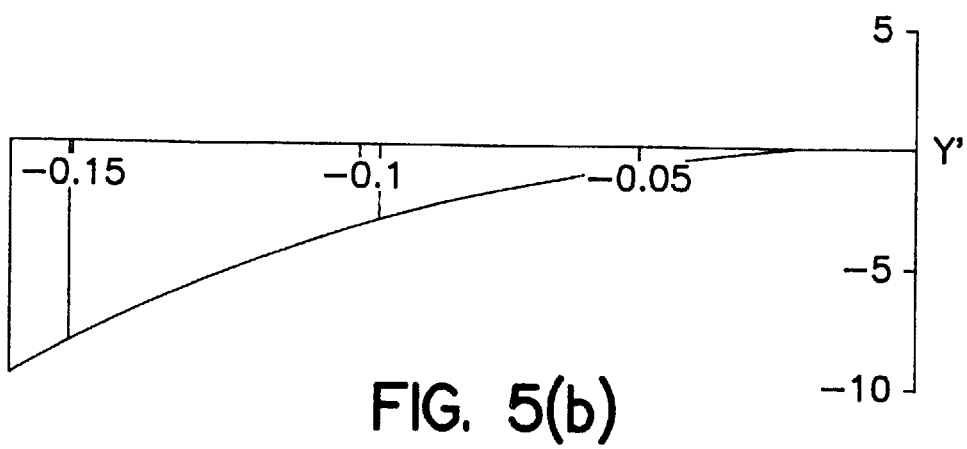
Figure 5C:
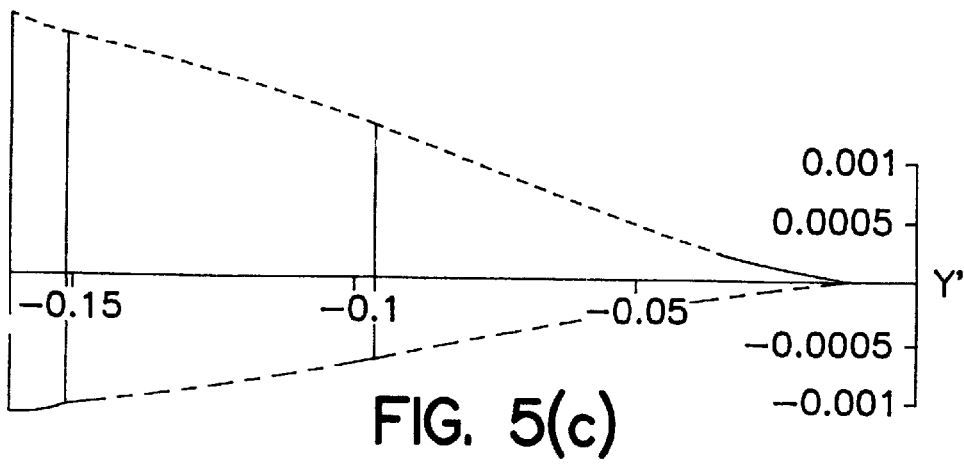
Figure 5D:
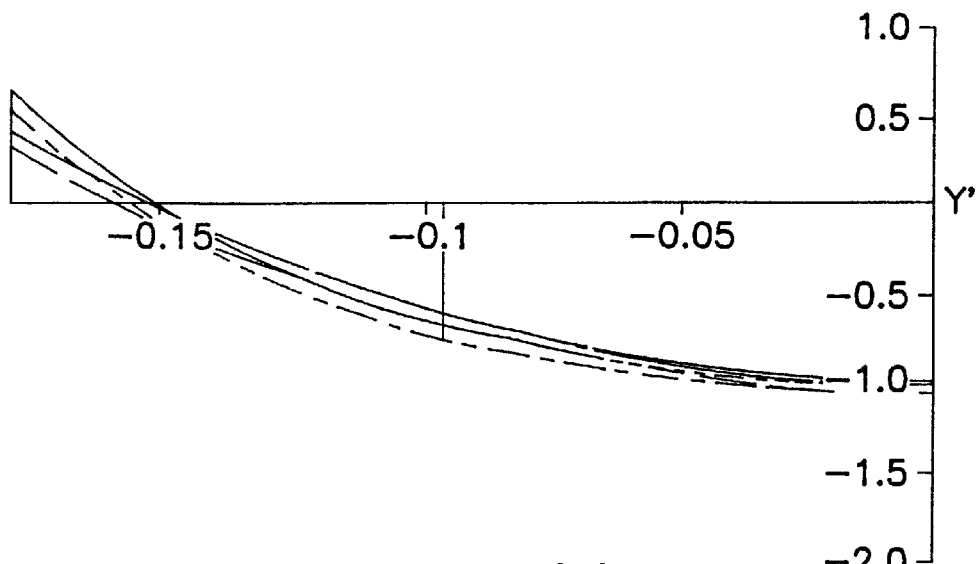
Figure 5E:
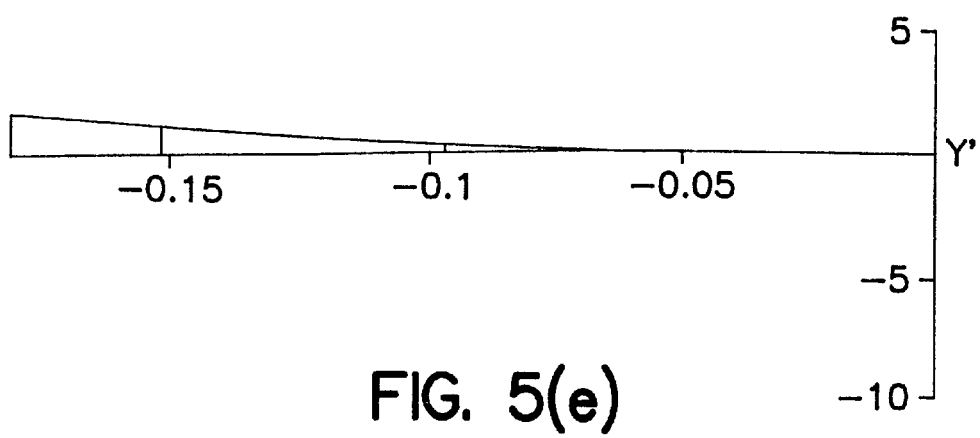
Figure 5F:
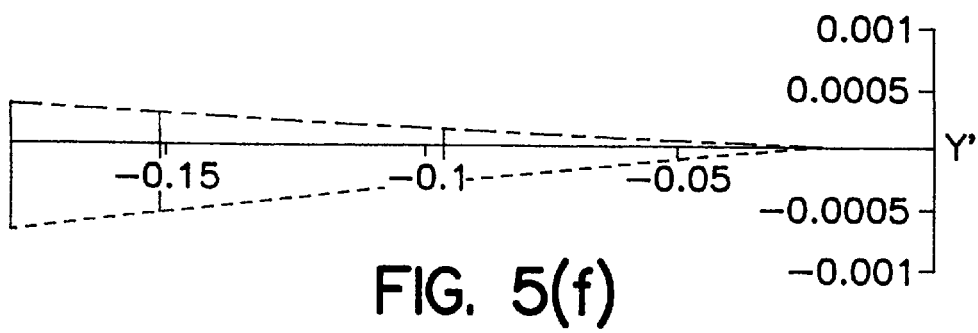

FIG. 6 is a perspective view showing the construction of third embodiment in the form of a real image finder optical system of the Kepler type used as a viewfinder for a single lens reflex camera. The third embodiment is an example of a finder optical system constructed to invert the image light from a photographic lens element using a relay lens element rather than a pentagonal prism as an erect optical system.

In FIG. 6 the finder optical system of the third embodiment briefly comprises a main mirror ma to reflect image light transmitted through a photographic lens element (not illustrated), focal plate so to temporarily form an image of the image light reflected by said main mirror ma, finder mirrors m1–m3 to direct the image light on focal plate so toward the pupil side, relay lens system r interposed between finder mirrors m2 and m3 to invert the image light on the focal plate so and reform said image as a spatial image, and eyepiece lens system se incorporating a first eyepiece lens element se1 and a second eyepiece lens element se2 to enlarge the image reformed by said relay lens system on the pupil side.

Figure 7:
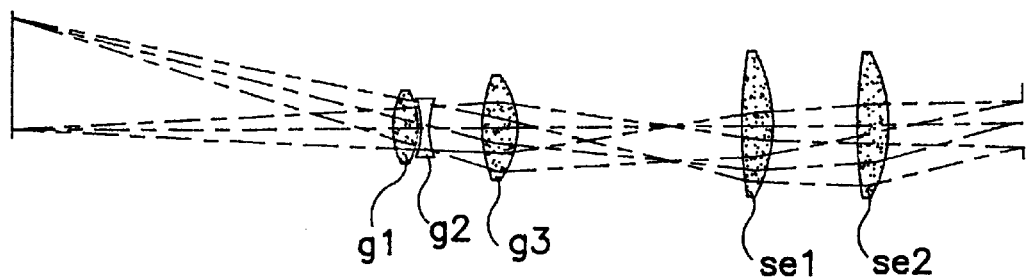
FIG. 7 shows the construction of the lens elements of the finder optical system of the third embodiment.

FIG. 7 shows the optical path of the light rays transmitted through the relay lens system r, first eyepiece lens element se1, and second eyepiece lens element se2 of the finder optical system of the third embodiment. The first through third finder mirrors are omitted since they do not optically participate with these light rays in the optical path shown in FIG. 7.

Relay lens system r comprises sequentially from the focal plate side, a biconvex first lens element g1, a biconcave second lens element g2, and a biconvex third lens element g3. The first eyepiece lens element se1 and the second eyepiece lens element se2 both are biconvex in configuration.

In the finder optical system of the third embodiment, the first lens element g1 of the relay lens system r, the first eyepiece lens element se1, and second eyepiece lens element se2 are all three formed of polymethylmethacrylate (PMMA), and the second lens element g2 of the relay lens system r is an optical element formed of noncrystalline polyester resin, and the third lens element g3 of the relay lens system r is an optical element of noncrystalline polyolefin (APO) which has optical characteristics near those of the aforesaid polymethylmethacrylate (PMMA) and which is unaffected by moisture absorption.

The finder optical system of the third embodiment is an extremely light weight finder optical system since the entire optical system is constructed of optical elements formed of resin. A compact finder optical system is realized by minimizing the empty space in the finder optical system by use of multiple mirrors in the optical path.

A noncrystalline polyester resin is used to form the second lens element g2 in the relay lens system r of the finder optical system of the third embodiment. Therefore, the finder optical system achieves excellent color aberration correction via the relay lens system r.

Ultraviolet light absorption agent may be added to the polymethylmethacrylate (PMMA) used to form the first lens element g1, the noncrystalline polyester resin used to form the second lens element g2, or the polymethylmethacrylate (PMMA) used to form the first eyepiece lens element se1. This construction minimizes the influence of ultraviolet light absorption by noncrystalline polyester resin. Furthermore, the third finder mirror may be provided with the previously described antireflection layer to correct transmittance of the entire finder optical system. As a result, the finder optical system of the third embodiment is an optical system having flat spectral transmittance characteristics in the visible range of the entire optical system due to the minimal influence of ultraviolet light absorption.

Although the optical systems of the first through third embodiments have been described in terms of arranging optical elements with added ultraviolet light absorption agent on the anterior side or posterior side on the optical path of optical elements formed of noncrystalline polyester resin, suitable modifications are possible. That is, although it is normally desirable to arrange optical element with added ultraviolet light absorption agent on either the object side or pupil side of the optical element formed of noncrystalline polyester resin due to ultraviolet light irradiation of the optical system from both the object side of the objective lens system and the pupil side of the eyepiece lens system in real image finder optical systems of the Kepler type as described in the aforesaid embodiments, either arrangement is effective in reducing ultraviolet light irradiating the optical elements formed of noncrystalline polyester resin. Furthermore, since ultraviolet light irradiation occurs only from the object side in the case of a photographic lens system using optical elements formed of noncrystalline polyester resin, an optical element with added ultraviolet light absorption agent may be disposed only on the object side of the optical element formed of noncrystalline polyester resin.

Examples of the eyepiece lens system of the present invention are described hereinafter.

Examples 1–3 are described by way of specific numerical examples relative to the first through third embodiment, and the constructions of the lens elements of examples 1–3 correspond to those shown in FIGS. 1–4.

In examples 1 and 2, ri (i=1,2,3 . . .) represents the radius of curvature of the number i surface including the surface forming the prism counting from the object side, di (i=1,2,3 . . .) represents the axial distance of the number i surface counting from the object side, ni (i=1,2,3) represents the number i optical element counting from the object side, vi (i=1,2,3 . . .) represents the g-line refractive index (Ng) of the prism, and the Abbe number (vd). The value of magnification β and the value of axial distance d2 of each example are values equivalent to the minimum focal length state (wide angle end) and maximum focal length state (telephoto end) sequentially from the left.

In example 3, ri (i=1,2,3 . . .) represents the radius of curvature of the No. i surface counting from the focal plate side, di (i=1,2,3 . . .) represents the axial distance of the number i surface counting from the object side, ni (i=1,2,3) represents the number i optical element counting from the object side, vi (i=1,2,3 . . .) represents the g-line refractive index (Ng) of the prism, and the Abbe number (vd).

In each example, a surface with an asterisk (*) attached to the radius of curvature is configured as an aspherical surface, and the shape of an aspherical surface is defined by the equation (AS) below.

$$x(y) = \frac{C \cdot y^2}{1 + \sqrt{1 - \varepsilon \cdot C^2 \cdot y^2}} + \sum_{i \geq 2} Ai \cdot y^i \quad \text{(AS)}$$

Where, x: height in a direction vertical to the optical axis;

y: amount of displacement from the reference spherical surface along the optical axis;

C: paraxial curvature;

$\varepsilon$: quadratic surface parameter; and

Ai: ith aspherical coefficient.

In the aspherical surface data of each example, Numbers followed by the letter E represent the exponent, e.g., 1.0E2 represents $1.0 \times 10^2$.

TABLE 2

| | β = 0.44 ~ 1.0 | | | | |
|---|---|---|---|---|---|
| Surface | Radius of Curvature | Axial Distance | Refractive Index | Abbe Number | Reference of Drawings |
| r1 | −20.139 | | | | |
| | | 1.000 | 1.62627 | 24.01(OP) | g1 |
| r2 | 20.260 | | | | |
| | | 12.12~1.92 | | | |
| r3 | 11.362 | | | | |
| | | 2.800 | 1.49329 | 57.82(PMMA) | g2 |
| r4 | −9.727 | | | | |
| | | 0.777 | | | |
| r5 | 40.000 | | | | |
| | | 16.000 | 1.58752 | 30.36(PC) | p1 |
| r6 | ∞ | | | | |
| | | 3.000 | | | |
| r7 | 17.489 | | | | |
| | | 23.373 | 1.58752 | 30.36(PC) | p2 |
| r8 | ∞ | | | | |
| | | 2.000 | | | |
| r9 | 19.205 | | | | |

TABLE 2-continued

β = 0.44 ~ 1.0

| | | 3.000 | 1.49329 | 57.82(PMMA) | se |
|---|---|---|---|---|---|
| r10 | −15.959 | | | | |

Aspherical Coefficient

| Surface | ε | A4 | A6 |
|---|---|---|---|
| r1 | 1.00 | −6.23E-04 | −2.40E-06 |
| r2 | 1.00 | −7.00E-04 | 2.80E-06 |
| r3 | 1.00 | −5.13E-04 | 1.00E-06 |
| r9 | 1.00 | −1.05E-04 | 2.00E-07 |

TABLE 3

β = 0.44 ~ 1.0

| Surface | Radius of Curvature | Axial Distance | Refractive Index | Abbe Number | Reference of Drawings |
|---|---|---|---|---|---|
| r1 | −19.355 | | | | |
| | | 1.000 | 1.58752 | 30.36(PC) | g1 |
| r2 | 18.569 | | | | |
| | | 12.12~1.92 | | | |
| r3 | 11.362 | | | | |
| | | 2.800 | 1.49329 | 57.82(PMMA) | g2 |
| r4 | −9.727 | | | | |
| | | 0.777 | | | |
| r5 | 40.000 | | | | |
| | | 16.000 | 1.58752 | 30.36(PC) | p1 |
| r6 | ∞ | | | | |
| | | 3.000 | | | |
| r7 | ∞ | | | | |
| | | 23.745 | 1.62627 | 24.01(OP) | p2 |
| r8 | 646.530 | | | | |
| | | 2.000 | | | |
| r9 | 20.861 | | | | |
| | | 3.000 | 1.49329 | 57.82(PMMA) | se |
| r10 | −14.630 | | | | |

Aspherical Coefficient

| Surface | ε | A4 | A6 |
|---|---|---|---|
| r1 | 1.00 | −6.23E-04 | −2.40E-06 |
| r2 | 1.00 | −7.00E-04 | 2.80E-06 |
| r3 | 1.00 | −5.13E-04 | 1.00E-06 |
| r9 | 1.00 | −1.05E-04 | 2.00E-07 |

TABLE 4

| Surface | Radius of Curvature | Axial Distance | Refractive Index | Abbe Number | Reference of Drawings |
|---|---|---|---|---|---|
| | | 48.2 | | | |
| r1 | 10.807 | | | | |
| | | 3.000 | 1.49329 | 57.82(PMMA) | g1 |
| r2 | −13.847 | | | | |
| | | 0.200 | | | |
| r3 | 11.363 | | | | |
| | | 1.200 | 1.62627 | 24.01(OP) | g2 |
| r4 | 11.18800 | | | | |
| | | 1.150 | | | |
| r5 | 16.1450000 | | | | |
| | | 4.300 | 1.52729 | 56.38(APO) | g3 |
| r6 | −9.998 | | | | |
| | | 28.799 | | | |
| r7 | 34.892 | | | | |
| | | 4.250 | 1.49329 | 57.82(PMMA) | se1 |
| r8 | −21.485 | | | | |
| | | 10.457 | | | |

TABLE 4-continued

| r9 | 46.228 | | | | |
|---|---|---|---|---|---|
| | | 3.800 | 1.49329 | 57.82(PMMA) | se2 |
| r10 | −21.149 | | | | |

Aspherical Coefficient

| Surface | ε | A4 | A6 | A8 | A10 |
|---|---|---|---|---|---|
| r3 | 0.22 | −2.19E-04 | 5.26E-06 | 6.73E-07 | −1.02E-07 |
| r6 | 0.88 | 1.76E-04 | 2.15E-06 | −5.43E-09 | 0.00E00 |
| r7 | 1.15 | −2.50E-05 | −4.52E-07 | 1.00E-09 | 0.00E00 |
| r9 | −140.81 | 6.31E-05 | −4.36E-07 | 2.56E-10 | 0.00E00 |

FIGS. 3(a)–(i) and 5(a)–(i) are aberration diagrams corresponding to examples 1 and 2. In these aberration diagrams, the total finder system has a photographic object distance of 3 m, (a) and (d) are astigmatism diagrams, (b) and (e) are distortion diagrams, (c) and (f) are magnification color aberrations diagrams. In each of the aberration diagrams, (a)–(c) represent aberration of the optical corresponding to the minimum focal length state (wide angle end), and (d)–(f) represent aberration at the maximum focal length state (telephoto end).

Figure 8A:
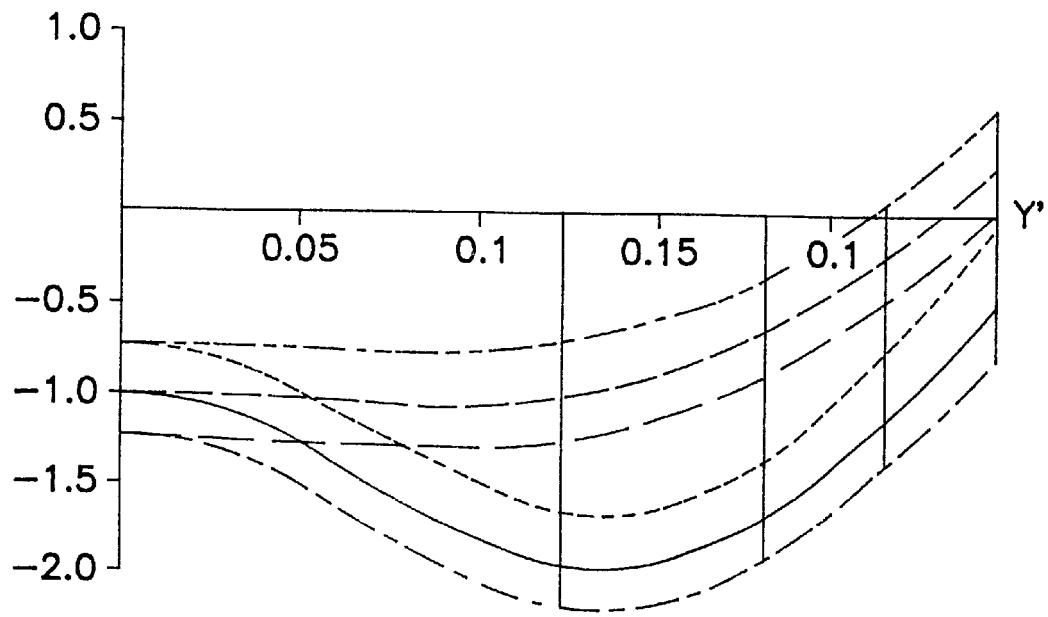
FIGS. 8a–8c are aberration diagrams of the finder optical system of the third embodiment.
Figure 8B:
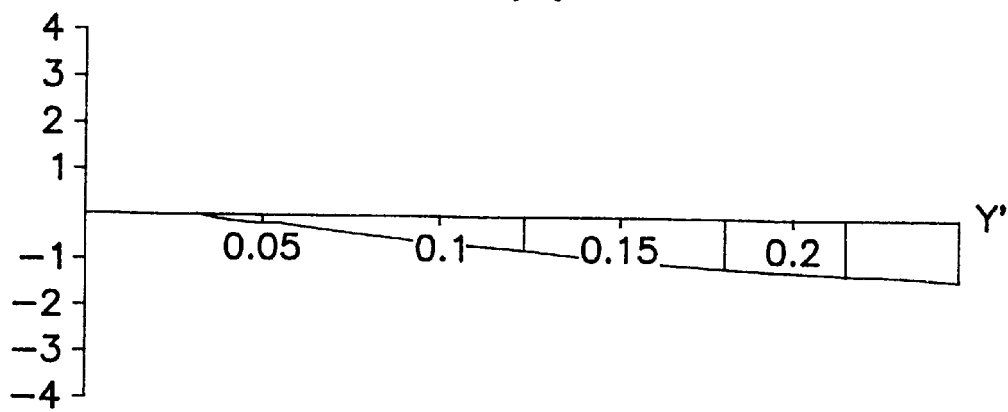
Figure 8C:
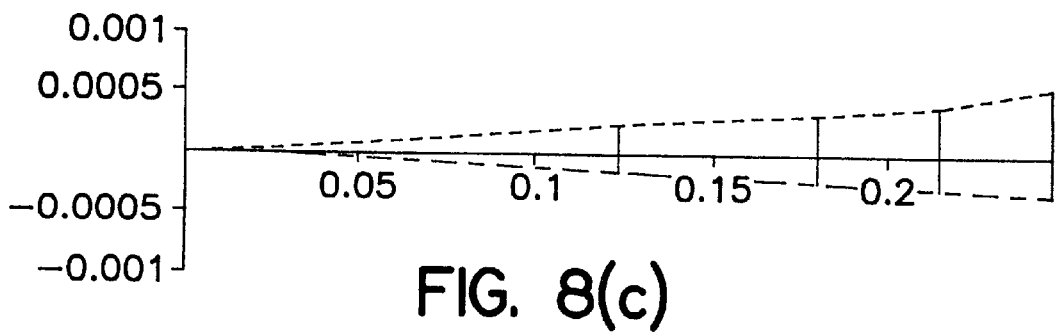

FIGS. 8(a)–(c) is an aberration diagram corresponding to example 3. The aberration diagram of FIGS. 8(a)–(c) shows the aberration of the combined optical systems of relay lens system and the eyepiece lens system; (a) shows astigmatism, (b) shows distortion, and (c) shows magnification color aberrations.

Figure 4:
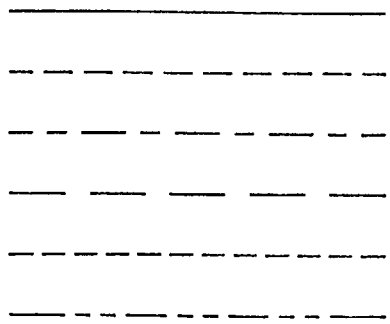
FIG. 4 shows notes for the aberration diagrams.

The explanatory notes for the curves of FIGS. 3(a)–(i), 5(a)–(i), and 8(a)–(c) are shown in FIG. 4. The vertical axis in the astigmatism diagram represents the diopter, the vertical axis in the distortion diagram represents the percentage, and the vertical axis in the magnification color aberrations diagram represents the angle (radian), whereas the horizontal axis in each diagram represents the incidence angle (radian) on the pupil surface.

APPLICATION TO A PHOTOGRAPHIC OPTICAL SYSTEM

The application of the present invention to a photographic optical system is described below with reference to the drawings. FIGS. 12–15 show the construction of lens elements corresponding to the optical systems of the fourth through seventh embodiments of the invention, and represent the lens arrangement in the minimum focal length state. In the drawing, the arrows represent the movement of the lens elements during the variable magnification from the minimum focal length state to the maximum focal length state.

Figure 12:
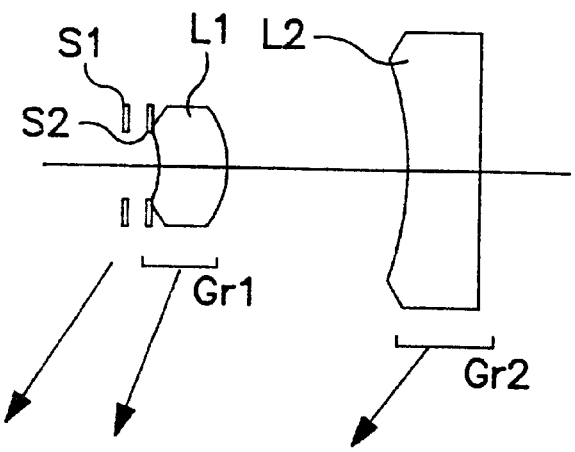
FIG. 12 shows the construction of lens elements of a photographic optical system of a fourth embodiment.

The optical system of the fourth embodiment comprises sequentially from the object side a diaphragm S1, first lens element Gr1 having positive optical power, and second lens element Gr2 having negative optical power, as shown in FIG. 12. This is a zoom optical system which moves the diaphragm S1 and first lens element Gr1 toward the object side to increase the space between the diaphragm S1 and the first lens element Gr1 and reduce the space between said first lens element Gr1 and second lens element Gr2 when zooming from the minimum focal lens end to the maximum focal length end.

The first lens element Gr1 comprises sequentially from the object side a diaphragm S2, and a first lens element L1 having a concave surface with a positive meniscus facing the object side and an aspherical surface on the object side and image side. The second lens element Gr2 comprises a second lens element L2 having a concave surface with a negative meniscus facing the object side, and aspherical surfaces on the object side and the image side. In the fourth embodiment, the second lens element L2 is a resin lens element formed of noncrystalline polyester resin.

In the zoom optical system of the fourth embodiment, the second lens element Gr2 with negative optical power comprises the single element of the second lens element L2 formed of noncrystalline polyester resin having a high refractive index and small Abbe number (large dispersion), so as to produce an excellent optical system having excellent aberration balance between the first lens element Gr1 ands the second lens element Gr2. In positive/negative two component zoom optical systems, the effective diameter of the lens element incorporated in the second lens element Gr1 tends to be large, an inexpensive zoom optical system is provided by using a single element construction for the second lens element L2 formed of noncrystalline polyester resin. Since the diaphragm is disposed on the object side of the first lens element Gr1, only a minimum amount of ultraviolet light irradiates the second lens element L2 formed of noncrystalline polyester resin. When this optical system is applied to a lens shutter camera, there is no loss of spectral transmittance characteristics due to ultraviolet radiation since no ultraviolet rays reach the second lens element L2 other than during exposure.

Figure 13:
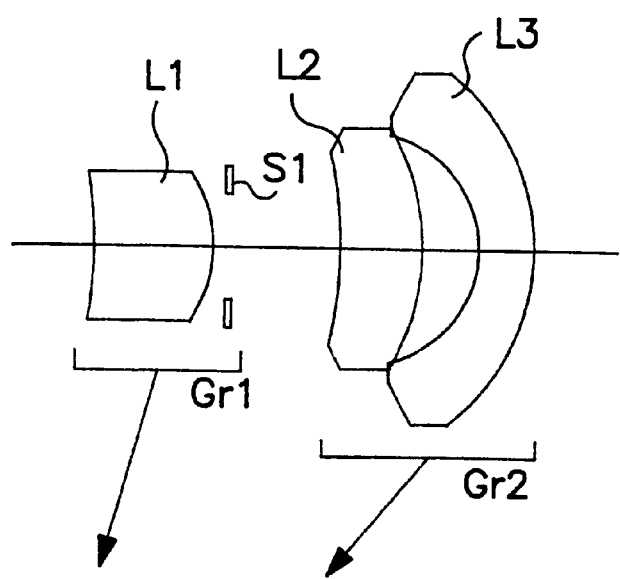
FIG. 13 shows the construction of lens elements of a photographic optical system of a fifth embodiment.

The optical system of the fifth embodiment comprises sequentially from the object side a first lens element Gr1 having positive optical power, and a second lens element Gr2 having negative optical power, as shown in FIG. 13; this is a zoom optical system which moves the first lens element Gr1 to the object side to reduce the space between said first lens element Gr1 and second lens element Gr2 when zooming from the minimum focal lens end to the maximum focal length end.

The first lens element Gr1 comprises sequentially from the object side a first lens element L1 having a positive meniscus concave surface facing the object side and aspherical surfaces on the object side and image side, and a diaphragm S1. The second lens element Gr2 comprises a second lens element L2 having a negative meniscus concave surface facing the object side and aspherical surfaces on the object side and image side, and a third lens element L3 having a negative meniscus concave surface on the object side. In the fifth embodiment, the second lens element L2 is a resin lens formed of noncrystalline polyester resin.

In the zoom optical system of the fifth embodiment, the second lens element Gr2 with negative optical power comprises two element including a second lens element L2 formed of noncrystalline polyester resin and a third lens element L3, The negative optical power of the second lens element Gr2 may be divided among the various lens elements. Excellent color aberration balance is achieved over the entire system by using a two element construction with different Abbe numbers for the second lens element Gr2. This two-ply negative lens element also provides excellent correction of aberration such as astigmatism over the entire system. Since the diaphragm is disposed on the object side of the second lens element Gr2, there is a minimal ultraviolet light irradiating the second lens element L2 formed of noncrystalline polyester resin. Since there is scant irradiation of the second lens element L2 other than during exposure when this optical system is applied to a lens shutter camera, this construction avoids loss of spectral transmittance characteristics due to ultraviolet exposure.

Figure 14:
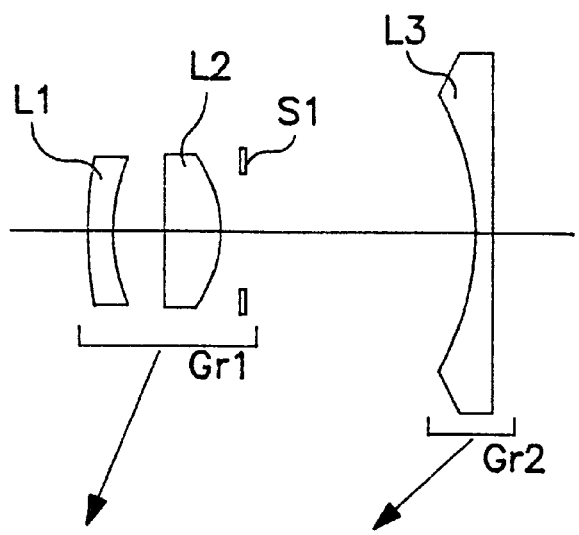
FIG. 14 shows the construction of lens elements of a photographic optical system of a sixth embodiment.

The optical system of the sixth embodiment comprises sequentially from the object side a first lens element Gr1 having positive optical power, and second lens element L2 having negative optical power, as shown in FIG. 14; this is a zoom optical system which moves the first lens element Gr1 toward the object side to reduce the space between said first lens element Gr1 and second lens element Gr2 when zooming from the minimum focal lens end to the maximum focal length end.

The first lens element Gr1 comprises sequentially from the object side a first lens element L1 with a convex surface and negative meniscus facing the object side and aspherical surfaces on the object side and image side, and a second lens element L2 with a concave surface and positive meniscus facing the object side, and a diaphragm S1. The second lens element Gr2 comprises a third lens element L3 with a concave surface and negative meniscus facing the object side and aspherical surfaces on the object side and image side. In the sixth embodiment, the first lens element L1 is a resin lens element formed of noncrystalline polyester resin.

In the zoom optical system of the sixth embodiment, the first lens element Gr1 having positive optical power has a two element construction comprising the first lens element L1 and second lens element L2 formed of noncrystalline polyester resin, and the positive optical power of the first lens element Gr1 is dispersed among the respective lens elements. The color aberration generated by the first lens element Gr1 is reduced by using a two element construction incorporating a negative lens element and positive lens element in the first lens element Gr1, so as to obtain excellent color aberration correction over the entire zoom range.

Figure 15:
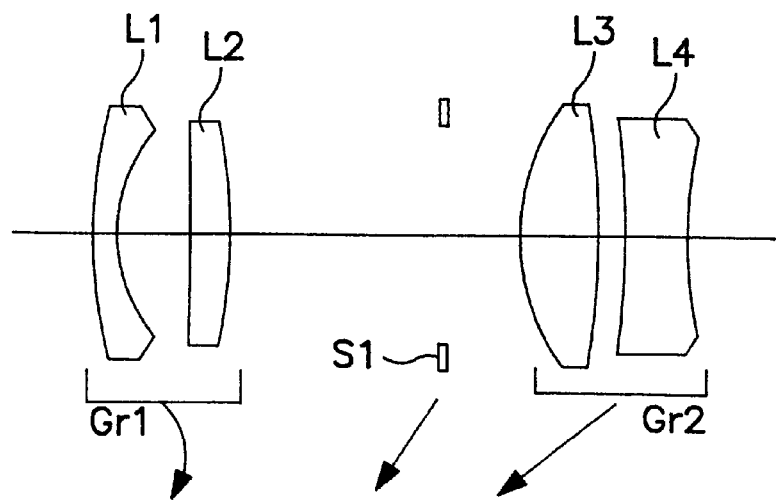
FIG. 15 shows the construction of lens elements of a photographic optical system of a seventh embodiment.

The optical system of the seventh embodiment comprises sequentially from the object side a first lens element Gr1 having negative optical power, diaphragm S1, and second lens element Gr2 having positive optical power, as shown in FIG. 15. This is a zoom optical system which moves the first lens element Gr1 toward the object side after moving toward the image side to reduce the space between the diaphragm S1 and second lens element Gr2 when zooming from the minimum focal lens end to the maximum focal length end.

The first lens element Gr1 comprises sequentially from the object side a first lens element L1 with a convex surface and negative meniscus facing the object side, and a second lens element L2 with weak positive optical power and aspherical surfaces on the object side and image side. The second lens element Gr2 comprises a biconvex third lens element L3 with aspherical surface on the object side, and a biconcave fourth lens element L4 with aspherical surfaces on the object side and image aide. In the seventh embodiment, the second lens element L2 and the fourth lens element L4 are resin lens elements respectively formed of noncrystalline polyester resin.

In the zoom optical system of the seventh embodiment, various types of aberration, and especially color aberration, can be well corrected over the entire zoom range because color aberration generated by the first lens element Gr1 is corrected the second lens element L2 which is formed of noncrystalline polyester resin and has high dispersion, and the color aberration generated by the second lens element Gr2 is corrected by the fourth lens element L4 which is formed of noncrystalline polyester resin and has high dispersion.

The positive/negative two component zoom optical system of the seventh embodiment is an optimum optical system for video and replaceable lens elements of single lens reflex cameras because it provides a long lens back. In this type of optical system, it is difficult to reduce the number of lens elements when correcting various aberrations because aspherical lens cannot be overly used due to the difficulty in forming an aspherical surface on a glass lens element. In contrast, in the zoom optical system of the fourth embodiment, aspherical lens element can be used by using resin lens element in the various arrangements, thereby allowing a large reduction in the number of lens elements.

Numerical examples of the zoom optical systems of the present invention are described below.

Examples 4–7 are described by way of specific numerical examples relative to the fourth through seventh embodiments, and the constructions of the lens elements of examples 4–7 correspond to those shown in FIGS. 12–15. In these examples, ri (i=1,2,3 . . .) represents the radius of curvature of the No. i surface including the surface forming the prism counting from the object side, di (i=1,2,3 . . .) represents the axial distance of the number i surface counting from the object side, ni (i=1,2,3) represents the number i optical element counting from the object side, vi (i=1,2,3 . . .) represents the g-line refractive index (Ng) of the prism, and the Abbe number (vd). The values of the focal length f and F number in each example, the values of axial distance d1 and d4 of example 1, value of axial distance d3 in example 2, value of axial distance d5 in example 3, and axial distances d4 and d5 in example 4 are values corresponding to the minimum focal length state (wide angle end) intermediate focal length state, and maximum focal length state (telephoto end) sequentially from the left.

In each example, a surface with an asterisk (*) attached to the radius of curvature is configured as an aspherical surface, and the shape of an aspherical surface is defined by the above explained equation (AS).

In the aspherical surface data of each example, Numbers followed by the letter e represent the exponent, e.g., 1.0e2 represents $1.0 \times 10^2$ as explained above.

TABLE 5 f = 31.0–36.7–48.5   F no. = 5.90–6.99–9.23

| | Radius of Curvature | Axial Distance | Refractive Index | Abbe Number |
|---|---|---|---|---|
| r1 | ∞ | | | |
| | d1 | 2.000–4.500–8.000 | | |
| r2 | ∞ | | | |
| | d2 | 0.736 | | |
| r3* | −14.496 | | | |
| | d3 | 5.381 | N1 1.51728 | v1 69.43 |
| r4* | −7.345 | | | |
| | d4 | 14.324–8.572–1.000 | | |
| r5* | −21.277 | | | |
| | d5 | 6.133 | N2 1.62017 | v2 24.01 |
| r6* | −75.383 | | | |

Aspherical Coefficient

| r3* | | r4* | |
|---|---|---|---|
| ε | 0.10097e+02 | ε | 0.10704e+01 |
| A4 | −0.32782e−03 | A4 | −0.45534e−04 |
| A6 | −0.36928e−05 | A6 | −0.26518e−05 |
| A8 | −0.16457e−06 | A8 | 0.27099e−07 |
| A10 | 0.78284e−09 | A10 | 0.10353e−09 |
| A12 | −0.19359e−10 | A12 | −0.22597e−10 |
| r5* | | r6* | |
| ε | 0.28940e+01 | ε | 0.64258e+01 |
| A4 | 0.89750e−04 | A4 | 0.22461e−04 |
| A6 | −0.17712e−06 | A6 | 0.84453e−06 |
| A8 | −0.42223e−07 | A8 | −0.3939e−07 |
| A10 | 0.91605e−09 | A10 | 0.59651e−09 |
| A12 | −0.18828e−12 | A12 | −0.31746e−11 |

TABLE 5-continued f = 31.0–36.7–48.5   F no. = 5.90–6.99–9.23

| A14 | −0.31908e−13 | A14 | 0.25005e−14 |
|---|---|---|---|
| A16 | −0.28518e−15 | A16 | 0.21781e−16 |

TABLE 6 f = 36.1–46.0–58.5   F no. = 5.80–6.99–9.31

| | Radius of Curvature | Axial Distance | Refractive Index | Abbe Number |
|---|---|---|---|---|
| r1* | −48.073 | | | |
| | d1 | 7.116 | N1 1.49300 | v1 58.34 |
| r2* | −8.067 | | | |
| | d2 | 1.000 | | |
| r3 | ∞ | | | |
| | d3 | 6. 492–3.965–2.000 | | |
| r4* | −17.119 | | | |
| | d4 | 5.000 | N2 1.62017 | v2 24.01 |
| r5* | −20.145 | | | |
| | d5 | 3.400 | | |
| r6 | −6.688 | | | |
| | d6 | 3.349 | N3 1.67339 | v3 29.25 |
| r7 | −12.853 | | | |

Aspherical Coefficient

| r1* | | r2* | |
|---|---|---|---|
| ε | 0.10000e+01 | ε | 0.10000e+01 |
| A4 | −0.51911e−03 | A4 | 0.20926e−04 |
| A6 | 0.72617e−05 | A6 | −0.17768e−05 |
| A8 | −0.11519e−05 | A8 | 0.32896e−06 |
| A10 | 0.23222e−07 | A10 | −0.15209e−07 |
| A12 | −0.20128e−08 | A12 | −0.51511e−09 |
| A14 | 0.17255e−09 | A14 | 0.46299e−10 |
| r3* | | r4* | |
| ε | 0.10000e+01 | ε | 0.10000e+01 |
| A4 | 0.17544e−03 | A4 | −0.10549e−03 |
| A6 | 0.50044e−06 | A6 | 0.38992e−05 |
| A8 | 0.21106e−06 | A8 | −0.19686e−06 |
| A10 | −0.14237e−08 | A10 | 0.19360e−08 |
| A12 | −0.13854e−09 | A12 | 0.47541e−10 |
| A14 | 0.22923e−11 | A14 | −0.10787e−11 |
| A16 | 0.60774e−13 | | |

TABLE 7 f = 36.0.45.9–58.5   F no. = 5.80–6.87–9.12

| | Radius of Curvature | Axial Distance | Refractive Index | Abbe Number |
|---|---|---|---|---|
| r1* | 16.867 | | | |
| | d1 | 1.600 | N1 1.62017 | v1 24.01 |
| r2* | 9.598 | | | |
| | d2 | 3.200 | | |
| r3 | −120.440 | | N2 1.52510 | v2 56.38 |
| | d3 | 3.410 | | |
| r4 | −7.911 | | | |
| | d4 | 1.533 | | |
| r5* | ∞ | | | |
| | d5 | 14.798–11.379–8.700 | | |
| r6* | −11.896 | | | |
| | d6 | 1.000 | N3 1.52510 | v3 56.38 |
| r7* | −130.746 | | | |

Aspherical Coefficient

| r3* | | r4* | |
|---|---|---|---|
| ε | 0.10000e+01 | ε | 0.10000e+01 |
| A4 | −0.78927e−03 | A4 | −0.55901e−03 |
| A6 | 0.11393e−05 | A6 | 0.45074e−05 |
| A8 | −0.14705e−06 | A8 | 0.41561e−07 |

TABLE 7-continued

| f = 36.0.45.9–58.5 | | F no. = 5.80–6.87–9.12 | |
|---|---|---|---|
| A10 | −0.10890e-09 | A10 | −0.47538e-09 |
| A12 | 0.47116e-10 | A12 | −0.10504e-09 |
| A14 | −0.19103e-10 | | |
| r5* | | r6* | |
| ε | 0.10000e+01 | ε | 0.10000e+01 |
| A4 | 0.47710e-03 | A4 | 0.27870e-03 |
| A6 | −0.11552e-04 | A6 | −0.42449e-05 |
| A8 | 0.40407e-06 | A8 | 0.37276e-09 |
| A10 | −0.14217e-07 | A10 | 0.20256e-09 |
| A12 | 0.23489e-09 | A12 | 0.16134e-11 |
| A14 | −0.13333e-11 | A14 | −0.17528e-13 |

TABLE 8 f = 36.0.45.9–78.0    F no. =4.6–5.2–5.8

| Radius of Curvature | Axial Distance | Refractive Index | Abbe Number |
|---|---|---|---|
| r1  49.226 | | | |
| d1 | 1.800 N1 | 1.67000 ν1 | 57.07 |
| r2  13.681 | | | |
| d2 | 6.150 | | |
| r3*  101.098 | | | |
| d3 | 3.450 N2 | 1.62017 ν2 | 24.01 |
| r4*  −229.615 | | | |
| d4 | 18.005–12.125–1.500 | | |
| r5  ∞ | | | |
| d5 | 6.400–1.400–1.400 | | |
| r6*  15.696 | | | |
| d6 | 6.480 N3 | 1.58170 ν3 | 68.75 |
| r7*  −90.361 | | | |
| d7 | 2.260 | | |
| r8  −31.979 | | | |
| d8 | 5.540 N4 | 1.62017 ν4 | 24.01 |
| r9  31.279 | | | |

Aspherical Coefficient

| r3* | | r4* | |
|---|---|---|---|
| ε | 0.10000e+01 | ε | 0.10000e+01 |
| A4 | −0.28488e-04 | A4 | −0.55290e-04 |
| A6 | −0.41908e-06 | A6 | −0.23229e-06 |
| A8 | 0.55699e-09 | A8 | −0.60351e-08 |
| A10 | −0.82581e-11 | A10 | 0.87023e-10 |
| A12 | −0.80258e-13 | A12 | −0.48455e-12 |
| r6* | | r8* | |
| ε | 0.10000e+01 | ε | 0.10000e+01 |
| A4 | −0.12667e-04 | A4 | 0.11715e-03 |
| A6 | −0.19757e-06 | A6 | 0.21783e-06 |
| A8 | 0.13723e-09 | A8 | −0.47475e-08 |
| A10 | 0.24715e-11 | A10 | 0.28973e-10 |
| A12 | 0.22403e-13 | A12 | −0.24019e-12 |
| r9* | | | |
| ε | 0.10000e+01 | | |
| A4 | 0.16325e-03 | | |
| A6 | 0.48451e-06 | | |
| A8 | 0.92886e-10 | | |
| A10 | 0.14731e-11 | | |
| A12 | −0.23152e-12 | | |

Figures 16A, 16B, 16C:
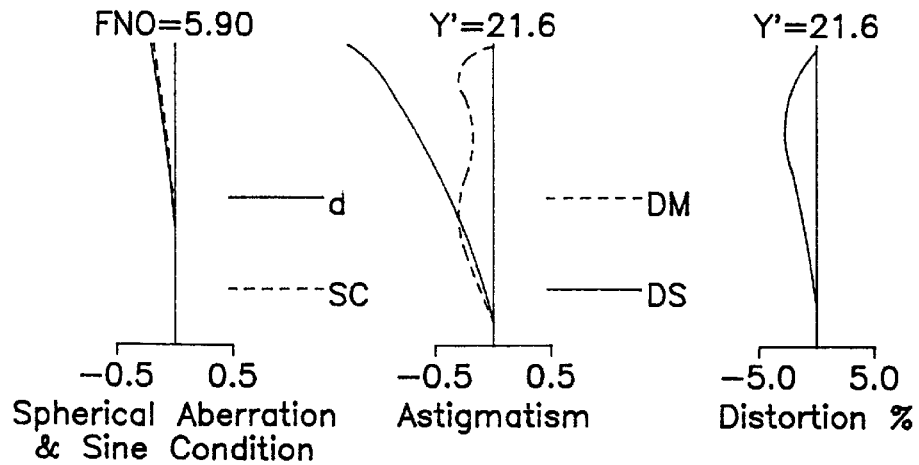
FIGS. 16a–16i are aberration diagrams of the photographic optical system of the fourth embodiment.
Figures 16D, 16E, 16F:
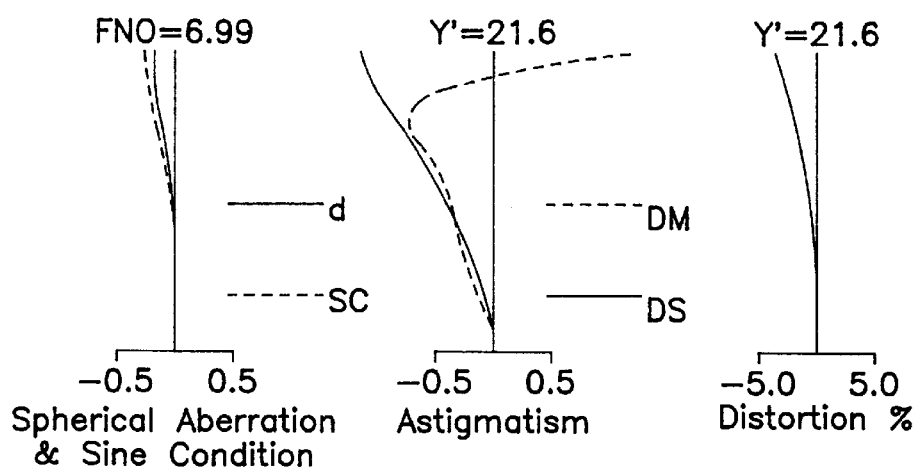
Figures 16G, 16H, 16I:
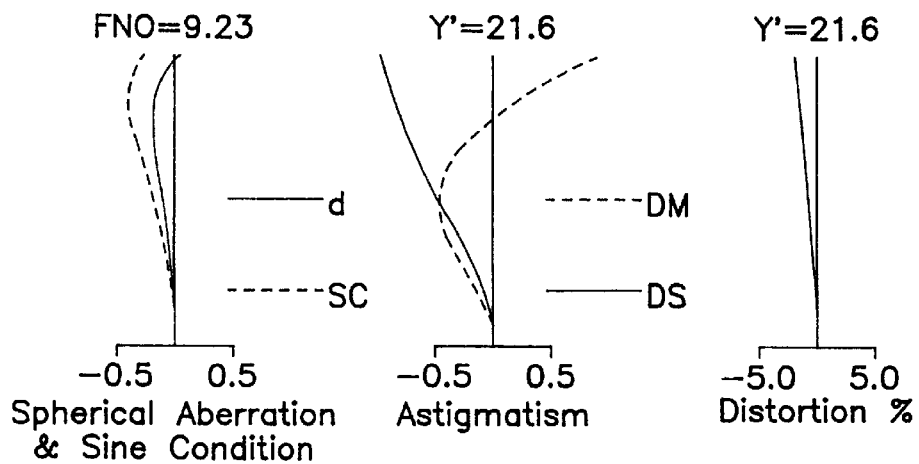
Figure 17A:
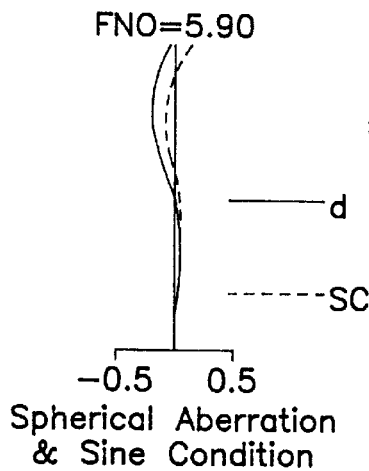
FIGS. 17a–17i are aberration diagrams of the photographic optical system of the fifth embodiment.
Figure 17B:
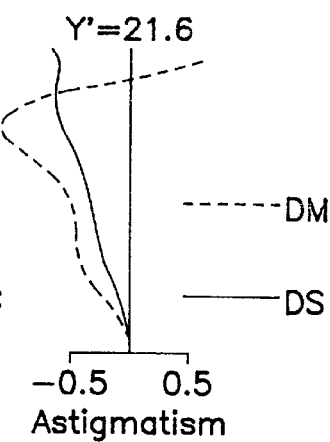
Figure 17C:
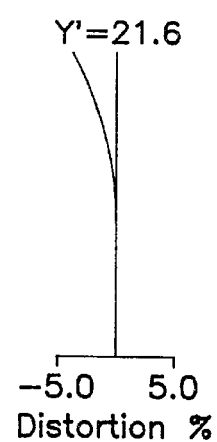
Figure 17D:
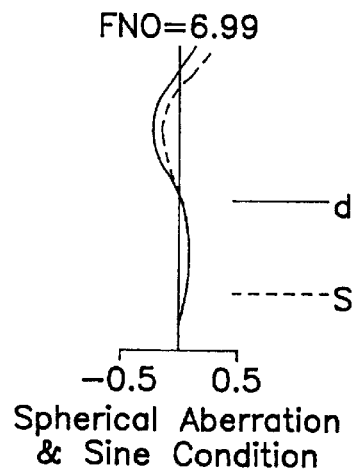
Figure 17E:
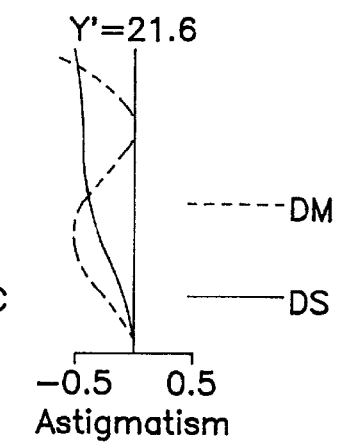
Figure 17F:
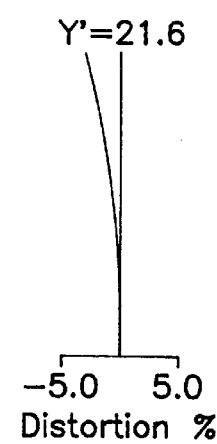
Figure 17G:
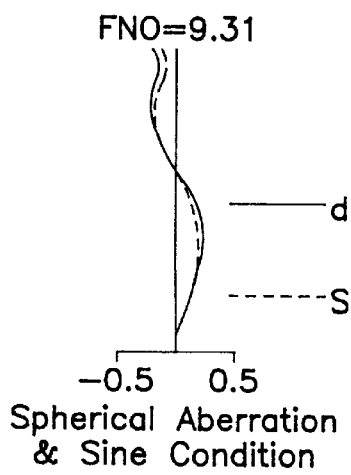
Figure 17H:
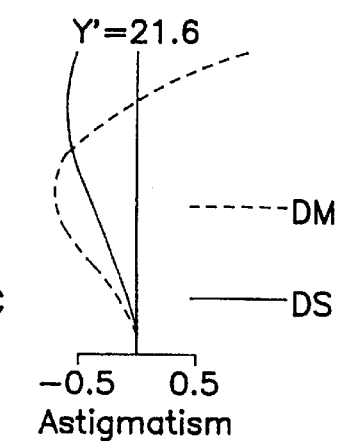
Figure 17I:
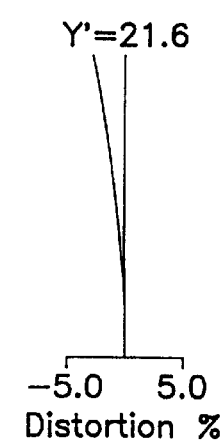
Figures 18A, 18B, 18C:
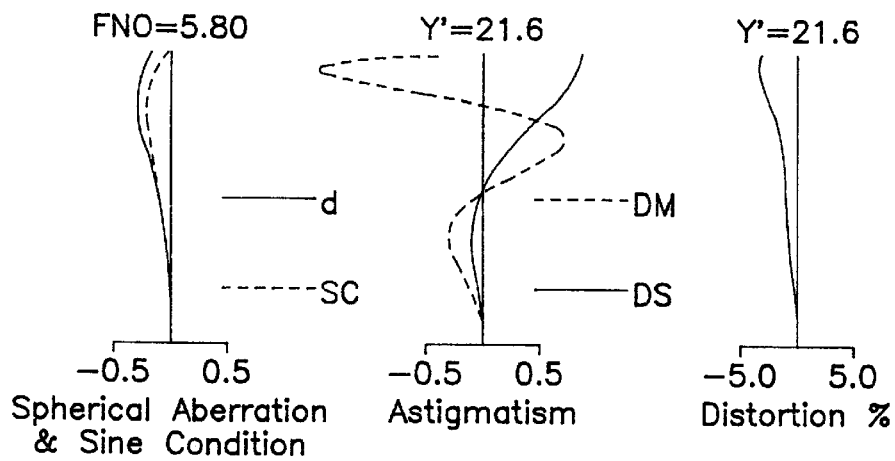
FIGS. 18a–18i are aberration diagrams of the photographic optical system of the sixth embodiment.
Figures 18D, 18E, 18F:
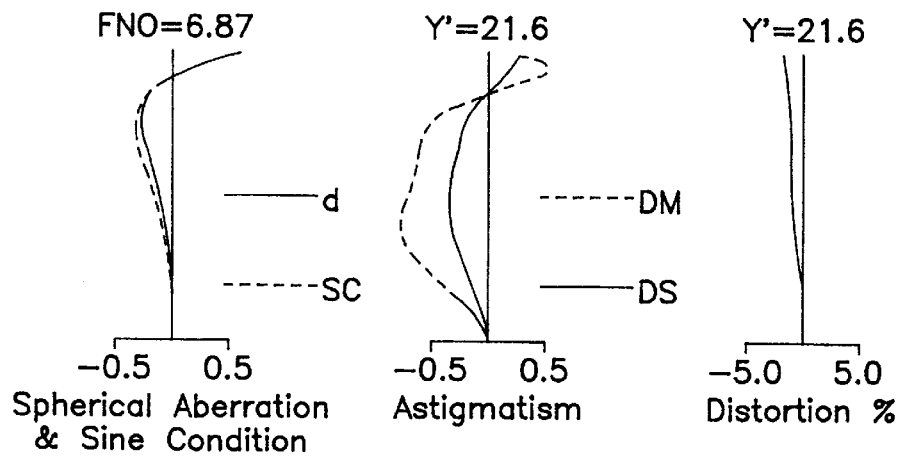
Figures 18G, 18H, 18I:
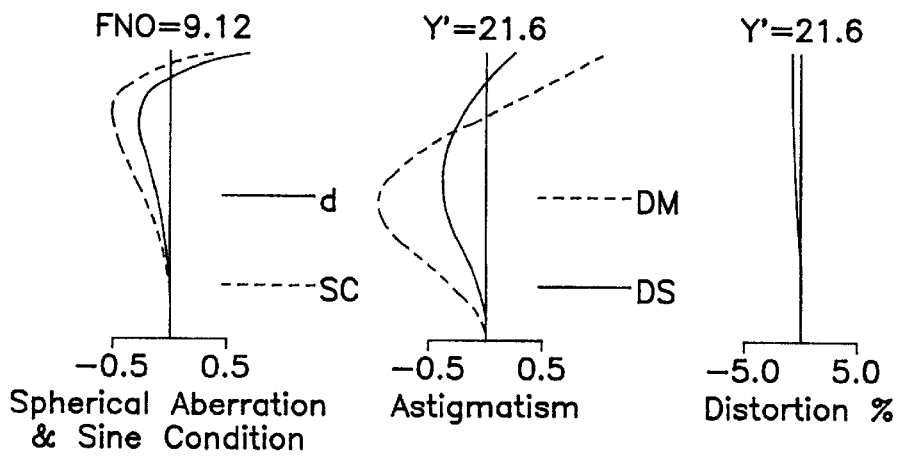
Figure 19A:
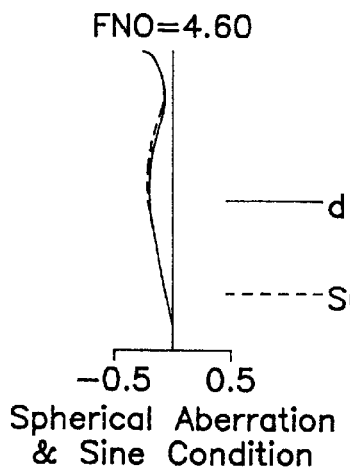
FIGS. 19a–19i are aberration diagrams of the photographic optical system of the seventh embodiment.
Figure 19B:
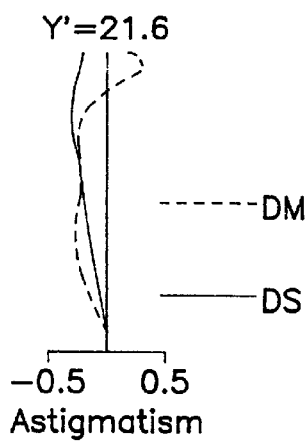
Figure 19C:
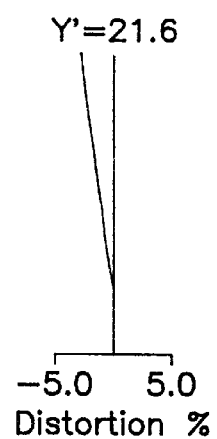
Figure 19D:
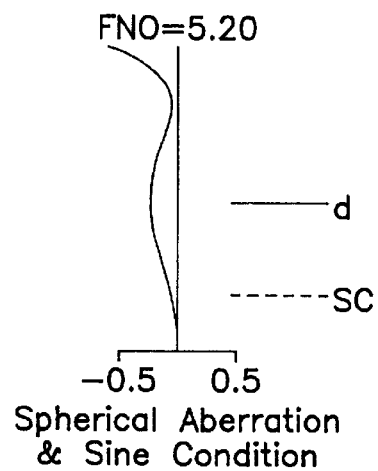
Figure 19E:
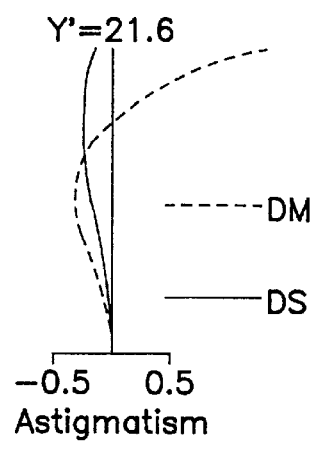
Figure 19F:
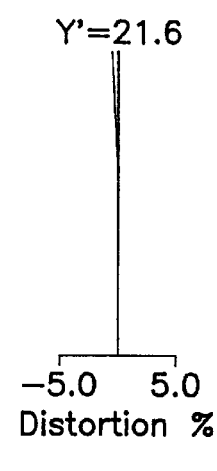
Figure 19G:
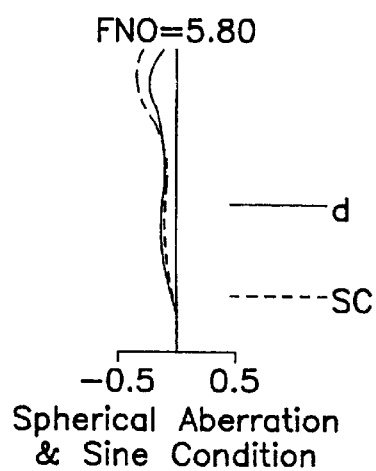
Figure 19H:
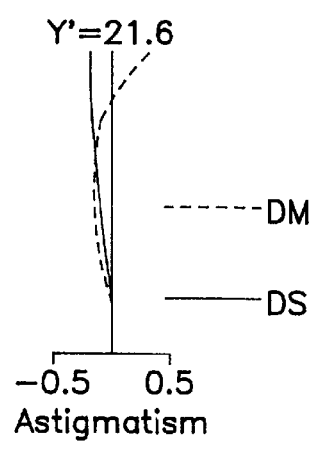
Figure 19I:
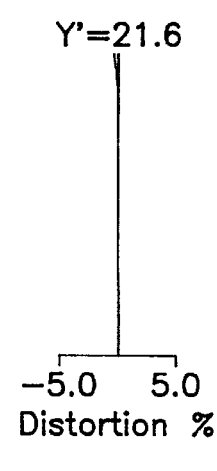

FIGS. 16 and 19 are aberration diagrams corresponding to examples 4 and 7. In each of the aberration diagrams, (a)–(c) represent aberration of the optical corresponding to the minimum focal length state (wide angle end), (d)–(f) represent aberration at the middle focal length state, and (g)–(i) represent aberration at the maximum focal length state (telephoto end).

In aberration diagrams, (a), (d) and (g) represent a spherical aberration diagram and sine condition diagram, (b), (e) and (h) represent a astigmatism diagram and (c), (f) and (i) represent a distortion diagram.

In each of the spherical aberration diagrams, the solid line represents the d-line spherical aberration, and the dashed line represents an insufficient sine condition. In each of the astigmatism diagrams, the solid line DS represents the saggital plane, and the dashed line DM represents the meridional plane. The vertical axes in all astigmatism and distortion diagrams represents the image height Y'.

The present invention provides an optical system suitable for mass production using optical resins having excellent optical characteristics in the visible range, excellent characteristics required as optical resins, and particularly excellent environmental stability.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An optical system having a plurality of optical elements comprising:
   a first optical element included in said plurality of optical elements, formed of noncrystalline polyester resin having a copolymer ratio of 9,9-bis {4-(2- hydroxyethoxy) phenyl}fluorene in a range of 35 molar percent to 45 molar percent when a dicarboxylic acid component is 100 molar percent, and
   a second optical element included in said plurality of optical elements, formed of material incorporating an ultraviolet light absorption agent and disposed at least either anteriorly or posteriorly to said first optical element.

2. The optical system of claim 1, wherein said system is a real image finder optical system of the Kepler type wherein said first optical element comprises a biconcave first objective lens element having negative optical power and said second optical element comprises a biconvex second objective lens element having positive optical power, and further comprising an erect optical system including a prism, and an eyepiece lens system.

3. The optical system of claim 2, wherein said prism is a penta-roof prism.

4. The optical system of claim 2, wherein said prism is a Porro prism which includes a first prism and second prism.

5. The optical system of claim 4, wherein said first prism and said second prism each respectively has a convex surface as an entrance surface.

6. The optical system of claim 4, wherein said first prism and second prism are formed of a material selected from a group consisting of polycarbonate (PC) and noncrystalline polyester resin.

7. The optical system of claim 2, wherein said eyepiece lens system includes an eyepiece lens element.

8. The optical system of claim 2, wherein said second objective lens element is formed of polymethylmethacrylate (PMMA).

9. The optical system of claim 1, wherein said system is a real image finder optical system of the Kepler type comprising a main mirror to reflect image light transmitted through a photographic lens element, focal plate to temporarily form an image of the image light reflected by said main mirror, finder mirrors to direct the image light on focal plate so toward a pupil side, relay lens system interposed between finder mirrors to invert the image light on the focal plate so and reform said image as a spatial image, and eyepiece lens system incorporating a first eyepiece lens element and a second eyepiece lens element to enlarge the image reformed by said relay lens system on a pupil side.

10. The optical system of claim 9, wherein said relay lens system comprises sequentially from the focal plate side, a biconvex first lens element, a biconcave second lens element, and a biconvex third lens element.

11. The optical system of claim 9, wherein said first eyepiece lens element and said second eyepiece lens element are biconvex lens elements.

12. An optical system having a plurality of optical elements comprising:
a first optical element included in said plurality of optical elements, formed of a noncrystalline polyester resin having a copolymer ratio of 9,9-bis {4-(2-hydroxyethoxy)phenyl}fluorene in a range of 35 molar percent to 45 molar percent when a dicarboxylic acid component is 100 molar percent, and
a second optical element included in said plurality of optical elements, formed of material incorporating an ultraviolet light absorption agent and disposed at least either anteriorly or posteriorly to said first optical element
wherein said system is a real image finder optical system of the Kepler type wherein said first optical element comprises a biconcave first objective lens element having negative optical power and said second optical element comprises a biconvex second objective lens element having positive optical power, and further comprising an erect optical system including a prism, and an eyepiece lens system,
wherein said prism is a Porro prism which includes a first prism and second prism, and
wherein an exit surface nearest a pupil side of the second prism of the erect optical system has a slightly concave surface, and a surface of the eyepiece lens system has negative optical power, and the entirety of the second prism is formed of noncrystalline polyester resin.

13. An optical system having a plurality of optical elements comprising:
a first optical element included in said plurality of optical elements, formed of noncrystalline polyester resin having a copolymer ratio of 9,9-bis {4(2-hydroxyethoxy) phenyl}fluorene in a range of 35 molar percent to 45 molar percent when a dicarboxylic acid component is 100 molar percent, and
a second optical element included in said plurality of optical elements, used for transmittancy correction.

14. An optical system according to claim 13, wherein said second optical element is a thin antireflection film having an optical thickness nd=$\lambda$/4 relative to the short wavelength side where d represents the film thickness, $\lambda$ represents the designed wavelength, and n represents the refractive index relative to the design wavelength of the coating material.

15. An optical system according to claim 14, wherein said antireflection film is on said first optical element as a material of the noncrystalline polyester resin.

16. An optical system according to claim 14, further comprising a reflective surface, wherein said antireflection film is on said reflective surface, said antireflection film including a dielectric layer having a low refractive index and optical thickness of $n_1 d=\lambda/4$, and a dielectric layer having a high refractive index and optical thickness of $n_2 d=\lambda/4$, where d represents a thickness of said antireflection film, $\lambda$ represents a design wavelength, and $n_1$ and $n_2$ represent the refractive index relative to the design wavelength of the respective dielectric layers.

17. An optical system comprising:
a positive lens unit; and
a negative lens unit including a lens element formed of noncrystalline polyester resin having a copolymer ratio of 9,9-bis {4-(2-hydroxyethoxy) phenyl}fluorene in a range of 35 molar percent to 45 molar percent when a dicarboxylic acid component is 100 molar percent.

18. The optical system of claim 17, wherein said system is a photographic optical system comprising sequentially from an object side a first diaphragm, said positive lens unit, and said negative lens unit.

19. The optical system of claim 18, wherein said positive lens unit comprises sequentially from the object side a second diaphragm, and a first positive meniscus lens having a concave surface facing the object side and an aspherical surface on each the object side and image side.

20. The optical system of claim 18, wherein said negative lens group comprises a second negative meniscus lens having a concave surface facing the object side, and aspherical surfaces on the object side and image side.

21. The optical system of claim 17, wherein said system is a photographic optical system comprising sequentially from an object side, said positive lens unit, and said negative lens unit, wherein said positive lens unit comprises sequentially from the object side a first positive meniscus lens having a concave surface facing the object side and aspherical surfaces on the object side and image side, and a diaphragm.

22. The optical system of claim 17, wherein said negative lens unit comprises a second negative meniscus lens having a concave surface facing the object side and aspherical surfaces on the object side and image side, and a third negative meniscus lens element having a concave surface facing the object side.

23. An optical system comprising:
a negative lens unit; and
a positive lens unit including a lens element formed of noncrystalline polyester resin having a copolymer ratio of 9,9-bis {4-(2-hydroxyethoxy) phenyl}fluorene in a range of 35 molar percent to 45 molar percent when a dicarboxylic acid component is 100 molar percent.

24. The optical system of claim 23, wherein said system is a photographic optical system comprising sequentially from the object side said positive lens unit including a first diaphragm, and said negative lens unit.

25. The optical system of claim 24, wherein said negative lens unit comprises a third negative meniscus lens with a concave surface facing the object side and aspherical surfaces on the object side and image side.

26. The optical system of claim 23, wherein said positive lens unit comprises sequentially from the object side a first negative meniscus lens with a convex surface facing the object side and aspherical surfaces on the object side and image side, and a second positive meniscus lens unit with a concave surface facing the object side, and a diaphragm, wherein said first lens is said noncrystalline polyester resin lens.

27. The optical system of claim 23, wherein said system is a photographic optical system comprises sequentially from the object side said negative lens unit, a diaphragm, and said positive lens unit having positive optical power.

28. The optical system of claim 27, wherein said positive lens unit comprises sequentially from the object side a first negative meniscus lens element with a convex surface facing the object side, and a second lens element with weak positive optical power and aspherical surfaces on the object side and image side, wherein said second lens element is said noncrystalline polyester resin lens.

29. The optical system of claim 27, wherein said negative lens unit comprises a biconvex third lens element with aspherical surface on the object side, and a biconcave fourth lens element with aspherical surfaces on the object side and image side.

30. An optical system for focusing an image on an image plane comprising:

a plurality of lens elements;

a diaphragm;

a lens element included in said plurality of lens elements, formed of noncrystalline polyester resin having a copolymer ratio of 9,9-bis {4-(2-hydroxyethoxy) phenyl}fluorene in a range of 35 molar percent to 45 molar percent when a dicarboxylic acid component is 100 molar percent, said lens elements being disposed between said diaphragm and said image plane.

* * * * *